July 2, 1968

H. S. RUEKBERG 3,390,427

INJECTION BLOW MOLDING MACHINES

Filed Oct. 22, 1965

INVENTOR
HERBERT S. RUEKBERG

BY
Mason, Porter, Diller, Brown
ATTORNEYS

July 2, 1968
H. S. RUEKBERG
3,390,427
INJECTION BLOW MOLDING MACHINES
Filed Oct. 22, 1965
11 Sheets-Sheet 2
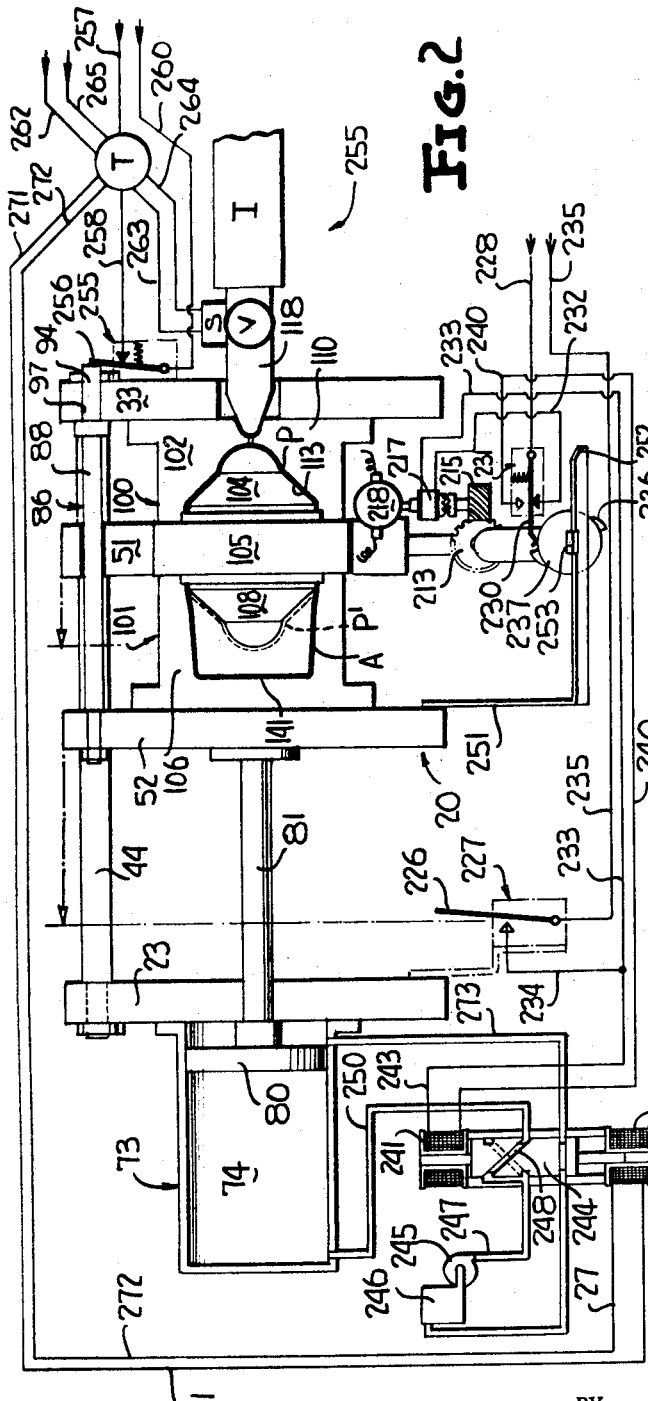
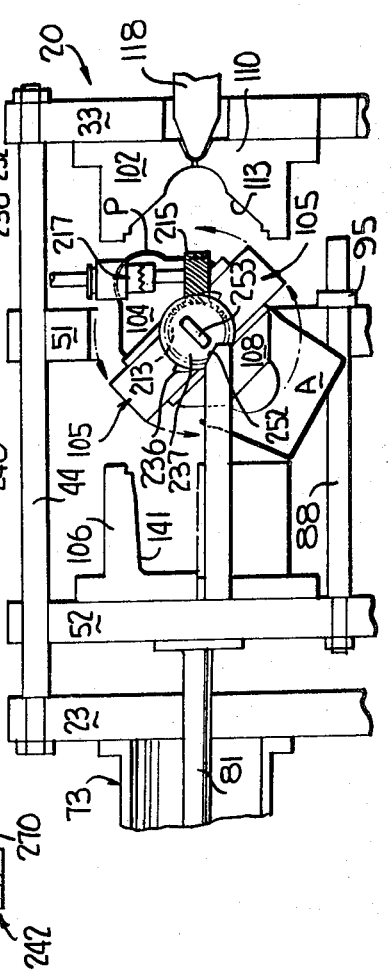
INVENTOR
HERBERT S. RUEKBERG
BY
Mason, Porter, Diller & Brown
ATTORNEYS

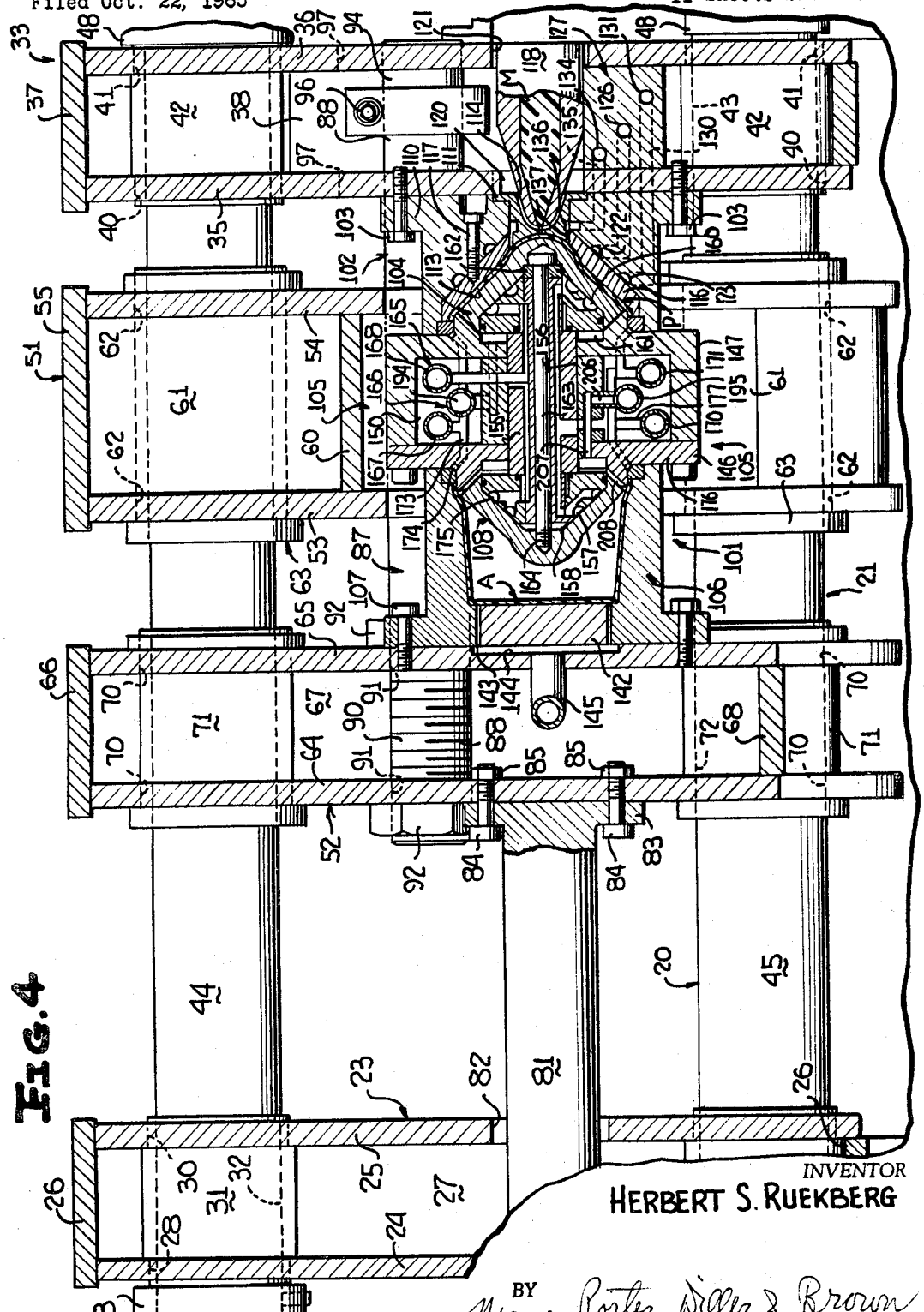

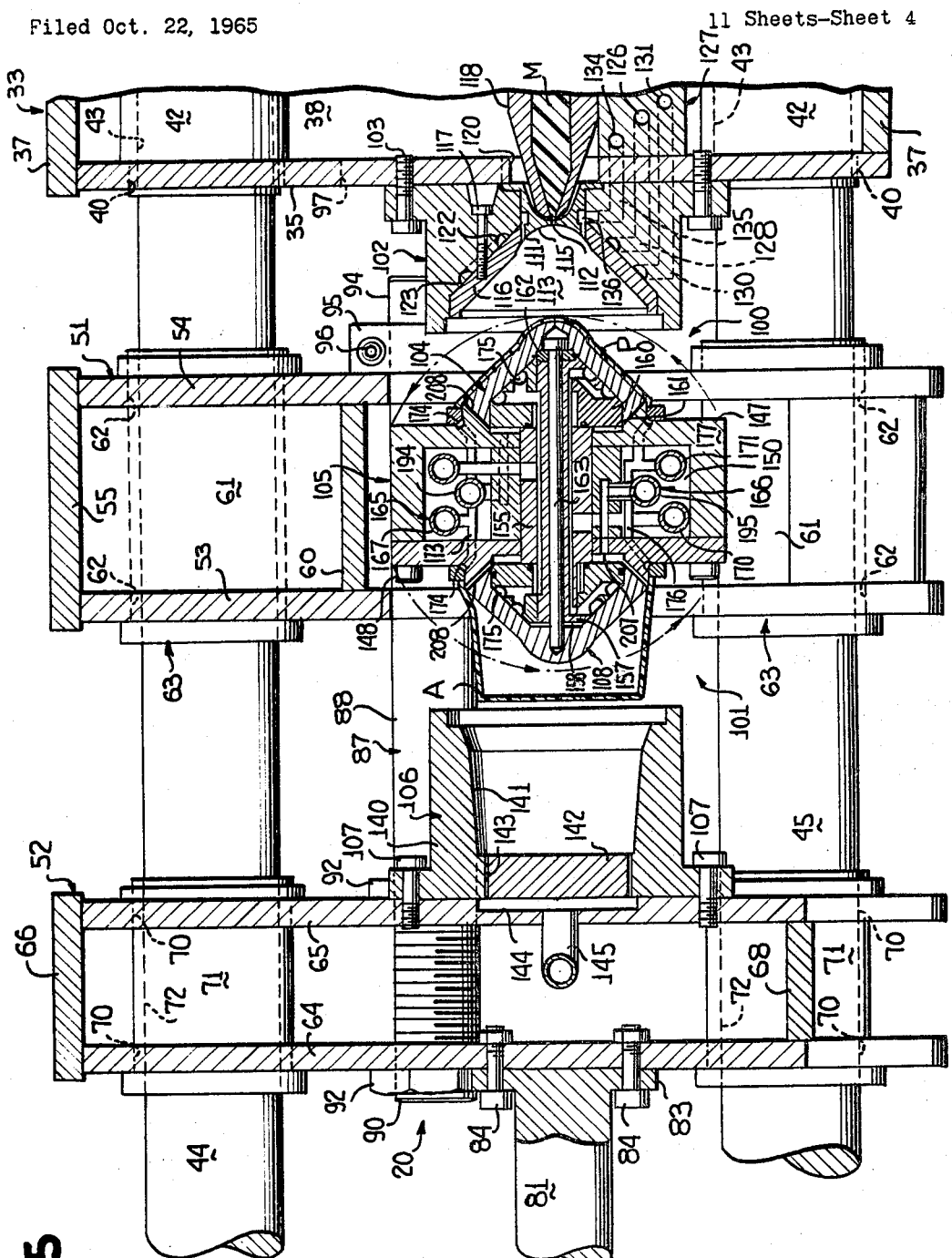

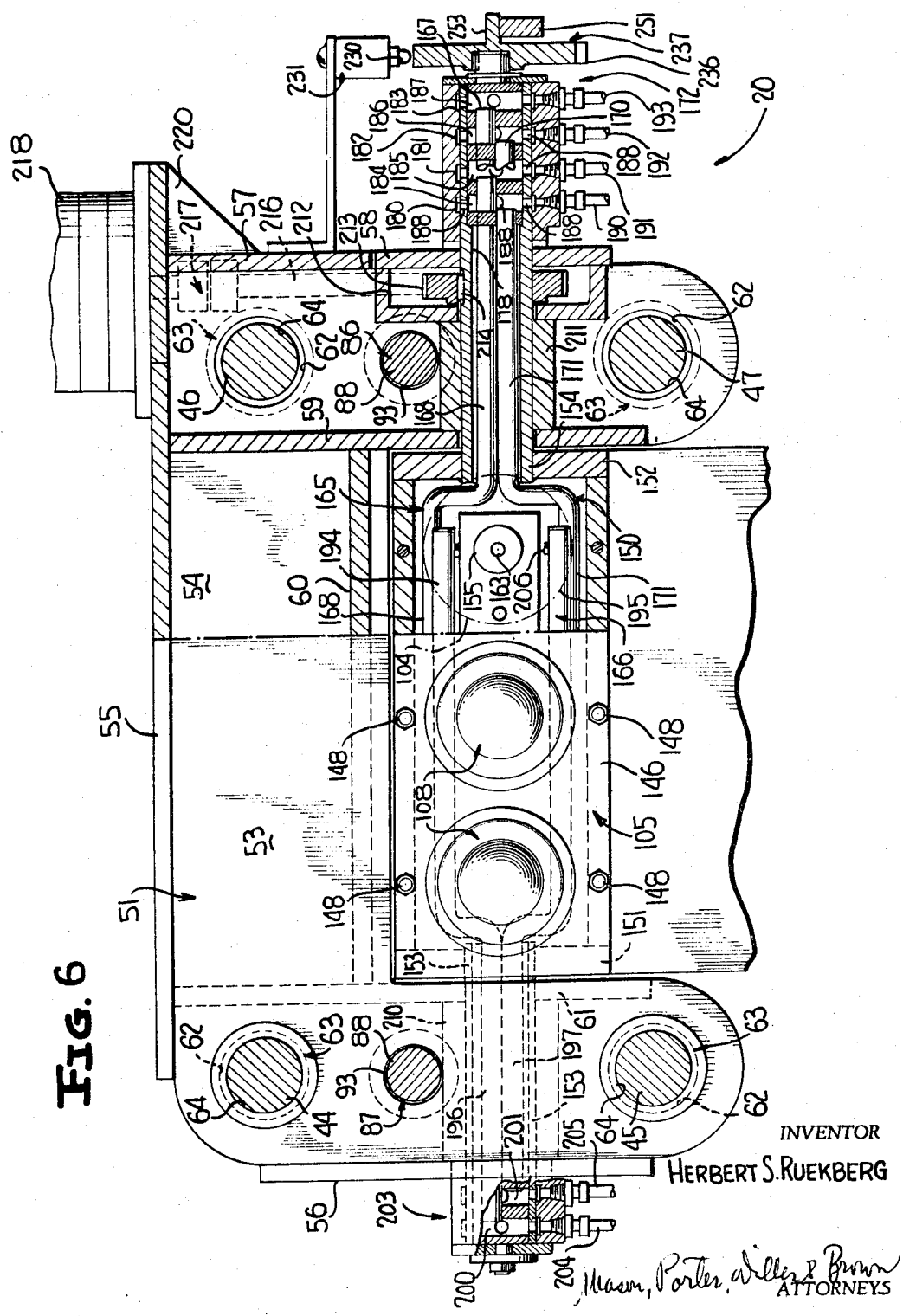

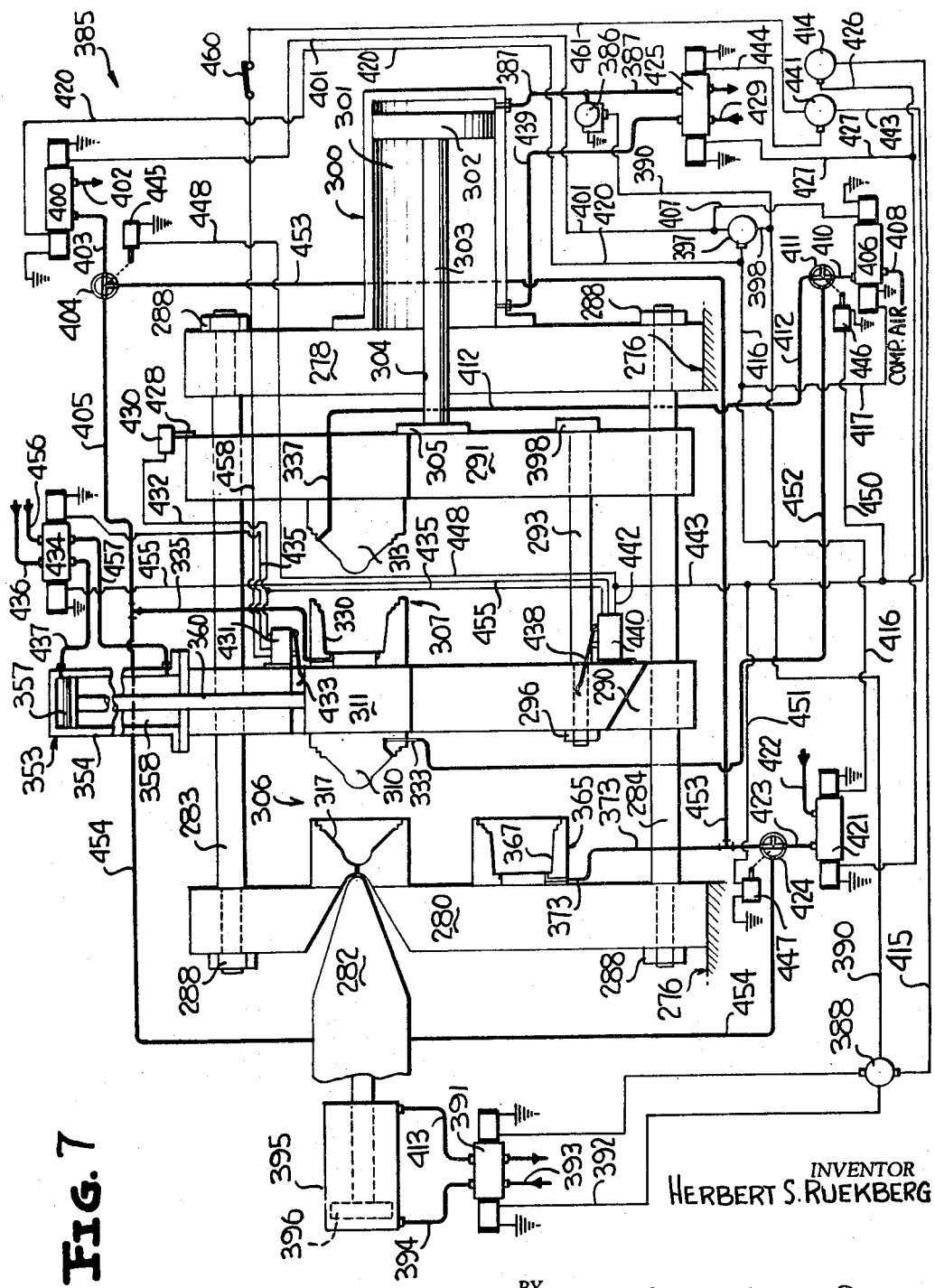

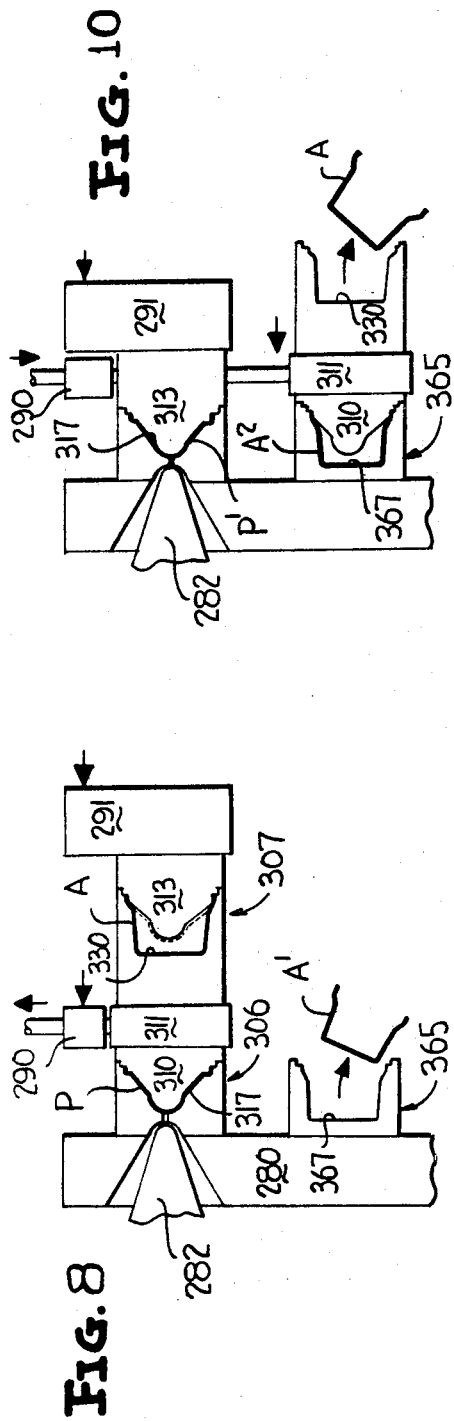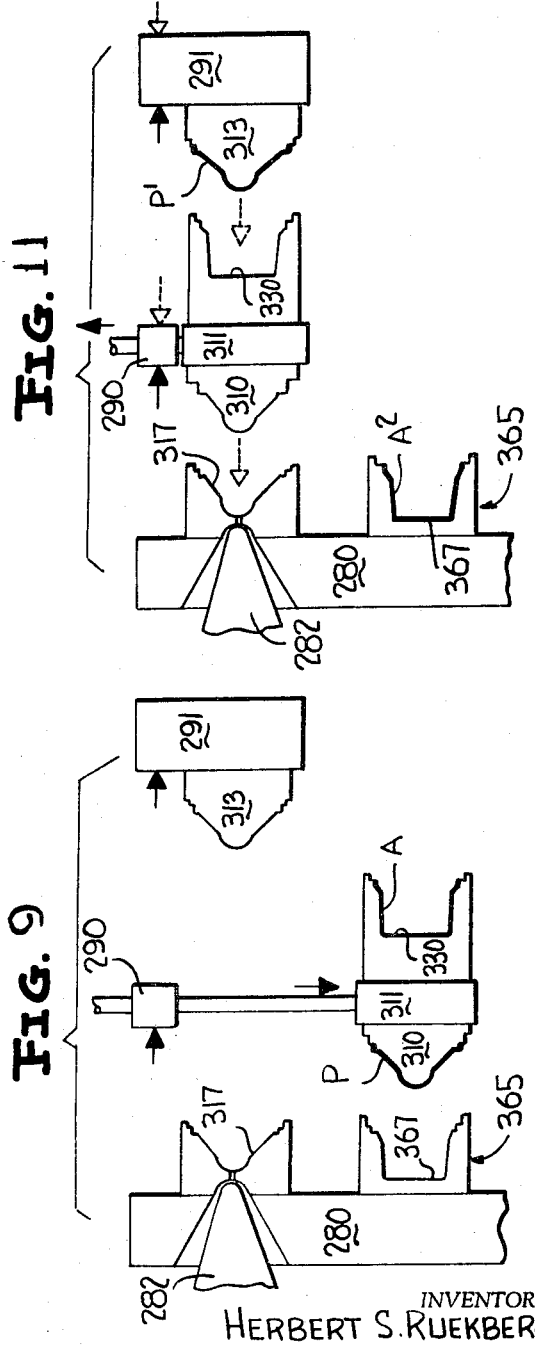

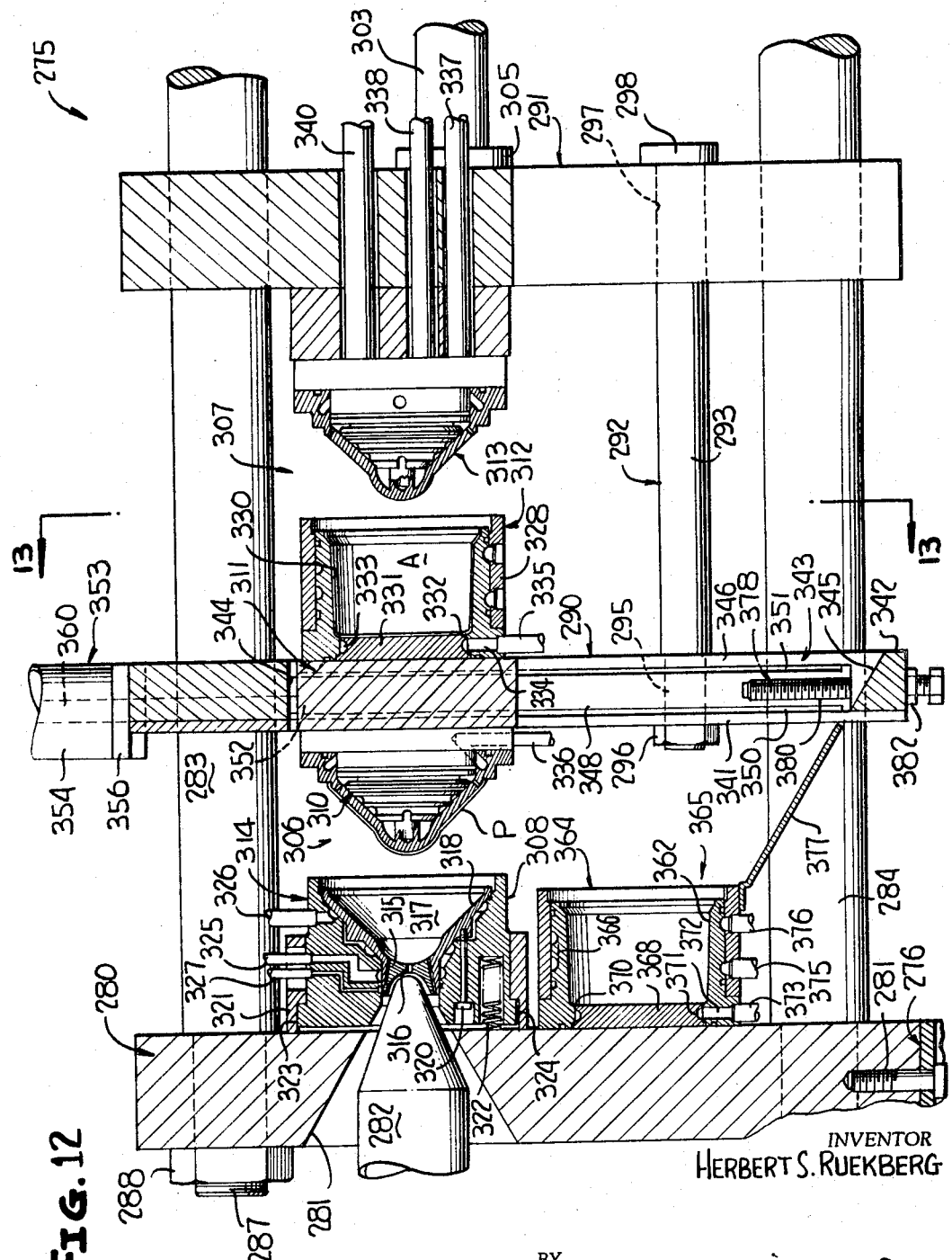

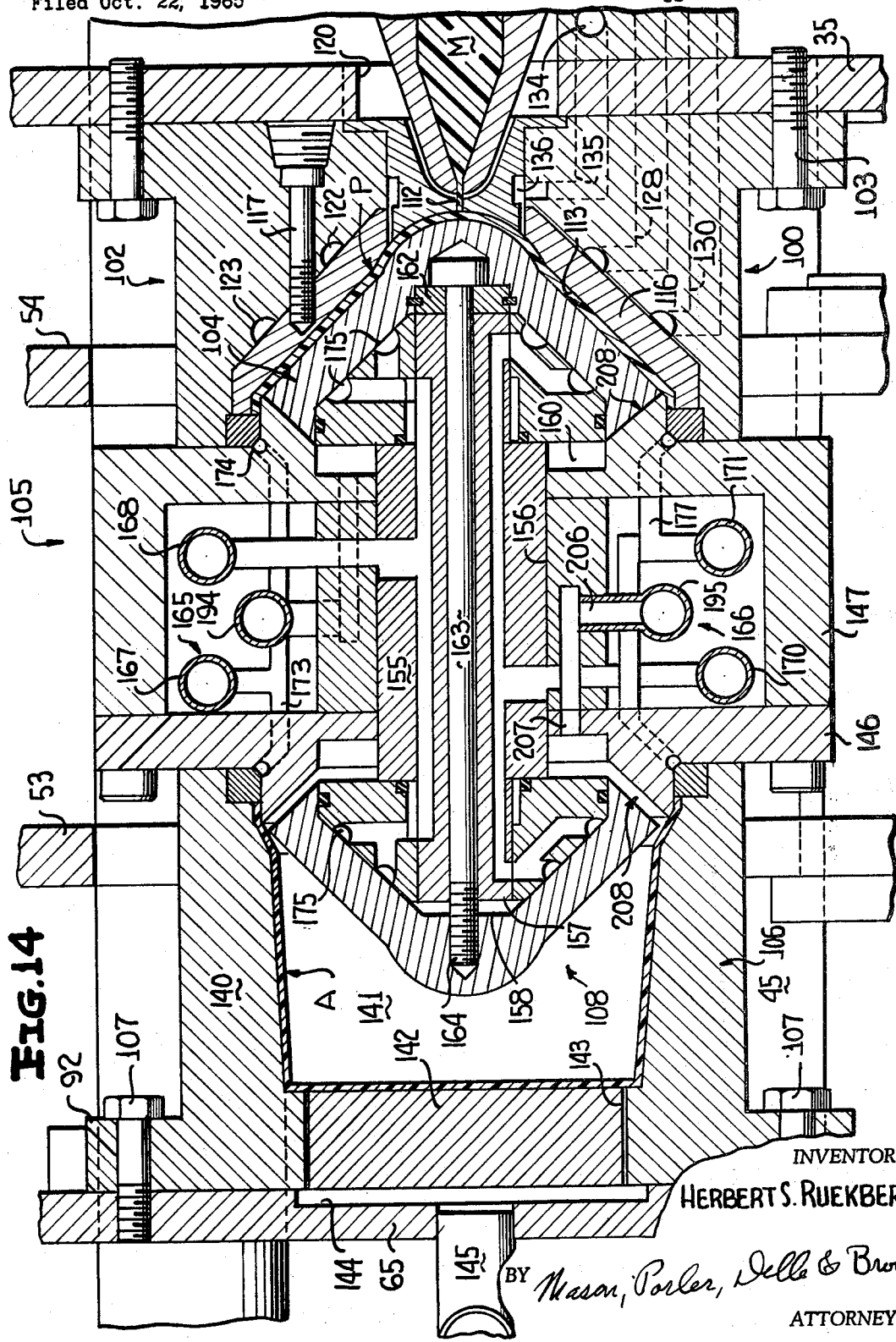

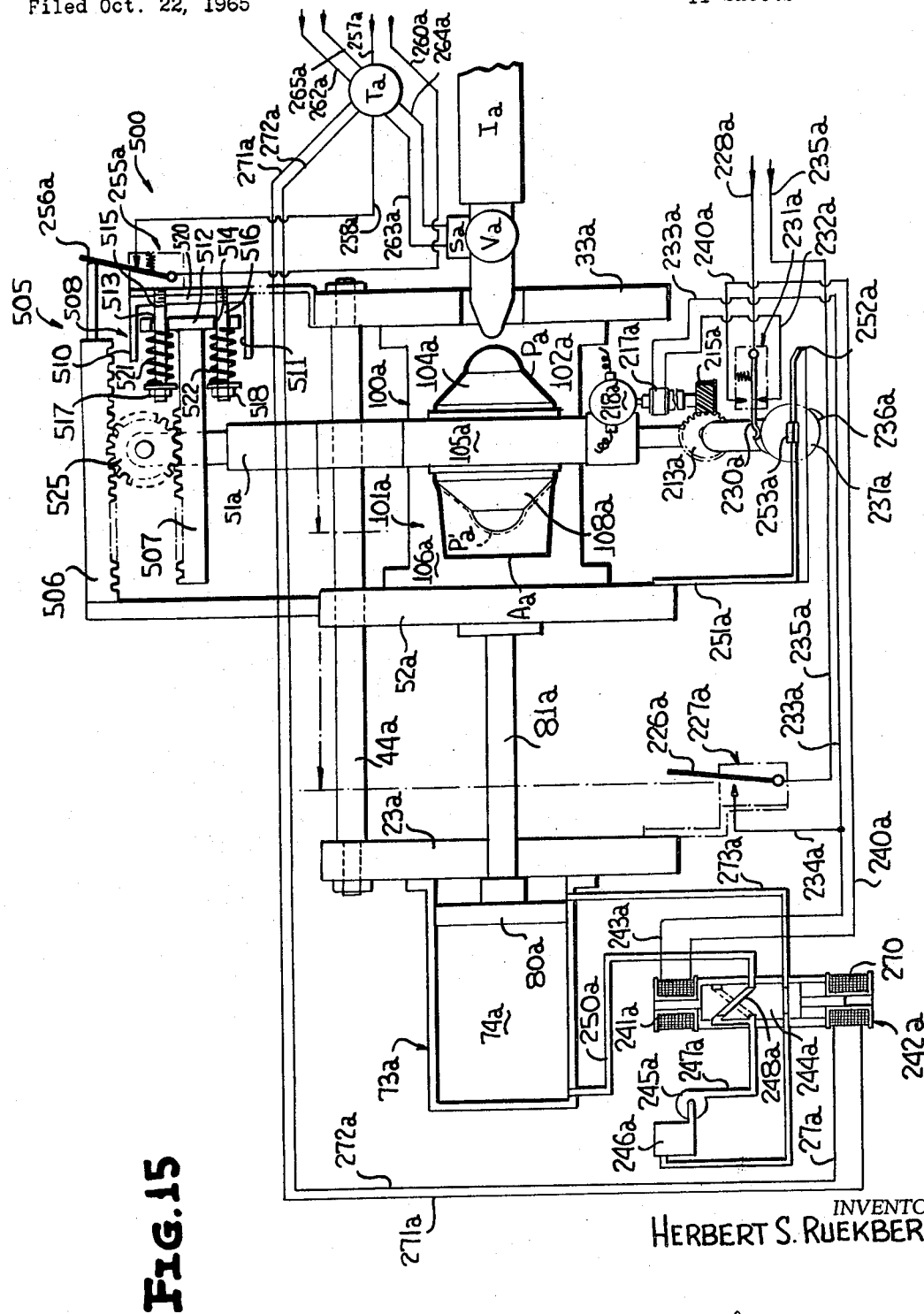

United States Patent Office 3,390,427
Patented July 2, 1968

3,390,427
INJECTION BLOW MOLDING MACHINES
Herbert S. Ruekberg, Highland Park, Ill., assignor to Continental Can Company, Inc., New York, N.Y., a corporation of New York
Continuation-in-part of application Ser. No. 339,545, Jan. 22, 1964. This application Oct. 22, 1965, Ser. No. 501,375
13 Claims. (Cl. 18—5)

ABSTRACT OF THE DISCLOSURE

This disclosure is directed to a molding machine which includes a pair of oppositely directed slidably mounted male cores each associated with a female mold cavity. During the injection of plastic material between a first of the cores and an associated mold cavity, aperture means therebetween are automatically closed while at the same time aperture means between the other core and its associated cavity are opened for blowing an article from a previously formed parison.

This application constitutes a continuation-in-part of my copending, commonly assigned application for U.S. Letters Patent, Ser. No. 339,545, filed Jan. 22, 1964.

This invention relates to novel molding machines for producing wide mouth articles, such as cups and tubs by sequentially injecting a slug or charge of flowable thermoplastic material in an injection cavity of an injection mold to form a molded parison, and simultaneously therewith blowing an article in a blow mold from a parison first molded in and transferred from the injection mold.

There are numerous conventional apparatus for and methods of forming articles from thermoplastic materials, and each of these prior art apparatus has disadvantages which are overcome by the novel molding machines of this invention. For example, during conventional vacuum forming of a thermoplastic article a web of thermoplastic material must be first extruded and then vacuum formed to the desired configuration of the article. During the vacuum formation of the article, the wall thickness varies when drawn to the desired configuration of the article and forms non-uniform wall portions in the article, as compared to the original constant thickness of the extruded plastic web. A waste web skeleton remains when the formed articles are cut therefrom during a conventional vacuum forming operation, and the finished articles present rough external surfaces formed by the cutting operation. Furthermore, thin wall articles cannot be successfully vacuum formed from brittle material, such as general purpose polystyrene, if it is necessary to supply the extruded web from a roll of the material because such material is too brittle to be handled in roll-form. Vacuum forming is also wasteful of heat if the web is supplied from a roll since the extruded web must be cooled before it is rolled up and then must be re-heated for the vacuum forming operation.

The novel molding machines of this invention overcome the above-noted disadvantages of the vacuum forming process by injection molding a parison in an injection mold, thus completely eliminating the necessity of extruding a web and the waste web skeleton. All portions of the finished articles are smooth and no cutting or blanking operation is performed. The molding machines of this invention can produce very thinned walled articles from brittle, as well as non-brittle material, and the wall thickness can be constant or can be of a predetermined desired different thickness at any portion of the formed article. The original heat used in melting the plastic is all that is required and no re-heating of the plastic is required such as is necessary when articles are being vacuum formed from web material supplied from a roll. Lastly, the molding machines of the present invention are extremely simple in design, resulting in a rapid and trouble-free operating cycle, as compared to conventional vacuum forming machines.

Another conventional method of forming substantially hollow articles from thermoplastic material involves the extrusion of a tube of thermoplastic material and expanding the tube in a blow mold having the configuration of the desired article. Articles made in this manner are apt to have welds or scars thereon caused by the pinching off of the open end of the tube in order to form the closed end of the hollow article. The material is also generally undesirably thick at the bottom or at the top of an article formed in this latter manner.

The molding machines of this invention blow mold an article from a first molded parison without the necessity of a severing operation and thus improve the appearance of the finished article by eliminating welds, scars, or similar external defects, as well as eliminating unduly thick portions in the walls of the article.

It is therefore an object of this invention to provide novel apparatus and methods for manufacturing thermoplastic articles in a manner which substantially eliminates the deficiencies inherent in prior art molding devices.

An object of this invention is to provide a novel molding machine having first, second and third platens; means cooperating between the first and second platens for molding a parison; means between the second and third platens for forming an article from a parison, and means for transferring a molded parison from a first cooperating means to the means between the second and third platens.

Still another object of this invention is to provide a novel molding machine comprising a stationary platen and first and second movable platens, means for moving the first and second movable platens linearly with respect to the stationary platen, first cooperating means between the first movable platen and the stationary platen for molding a parison, second cooperating means between the first movable platen and the second movable platen for forming a finished article from a parison, each of said cooperating means including a mold section defining a cavity and a core alignable for entry into the cavity, each core of each cooperating means being carried by a pivotable portion of the first movable platen, and means for pivoting the pivotable portion of the first movable platen to transfer a parison from one of the cooperating means to another of the cooperating means.

A further object of this invention is the provision of a novel molding machine of the type including first and second movable platens, a stationary platen, means for moving the first and second movable platens linearly with respect to the stationary platen, first cooperating means between the first movable platen and the stationary platen for molding a parison, second cooperating means between the first movable platen and the second movable platen for forming a finished article from a parison, each of the cooperating means including a mold section defining a cavity and a core alignable for entry into the cavity, a core and mold section of each of the cooperating means being carried by a reciprocal portion of the first movable platen, and means for reciprocating the reciprocal portion of the first movable platen to transfer a parison from the mold cavity of the first cooperating means.

A further object of this invention is to provide a novel molding machine comprising first and second movable platens, and a stationary platen; the first movable platen being positioned between the second and stationary platens; means for moving the movable platens with respect to the stationary platen; means for guiding the movable platens during the movement thereof; the first movable platen including a movable portion, means for moving the movable portion of the first movable platen, first molding means cooperating between the stationary platen and the movable portion of the first movable platen, second molding means cooperating between the second movable platen and the movable portion of the first movable platen, the first molding means including means for molding a parison, the second molding means including means for forming an article from a parison, and the movable portion being constructed and arranged for movement to transfer a parison molded by the first molding means to the second molding means.

Another object of this invention is to provide a novel molding machine which includes a pair of relatively movable mold bodies, one of said bodies defining a male core and the other of said bodies defining a female mold cavity, means for injecting molten plastic material between said bodies in a first closed position thereof to form a parison, means for blowing the molded parison to form an article, the blowing means including aperture means in fluid communication with a pressurized source of fluid, and means for closing the aperture means during the injecting of the parison whereby molten material is prevented from entering into and blocking the aperture means.

Still another object of this invention is to provide a novel method of producing formed articles by performing the steps of simultaneously molding a parison and forming an article from a first molded parison, discharging the article subsequent to moving both the molded parison and the article along a predetermined path of which at least a portion thereof is linear, and then again simultaneously molding another parison and forming another article from the molded parison.

A further object of this invention is to provide a novel method of producing formed articles by the steps of simultaneously molding a parison and blowing an article from a first formed parison in axially aligned sectional molds, separating the aligned sectional molds by moving sections thereof along a first linear path, discharging the article subsequent to moving other of the sections along a second path, and then again simultaneously molding another parison and blowing another article from the molded parison.

Still another object of this invention is to provide a novel method including each of the steps immediately above-described, and in addition, maintaining the second path of movement of the other sections substantially normal to the first linear path.

Another object of this invention is to provide a novel method of producing molded articles comprising the steps of simultaneously injection molding a parison and forming an article from a first injection molded parison in axially aligned sectional molds, separating the aligned sectional molds by moving sections thereof along a first linear path, discharging the article while moving another of the sections along a curved path and then again simultaneously molding another parison and forming another article from the molded parison.

With the above and other objects in view that will hereinafter appear, the nature of the invention will be more clearly understood by reference to the following detailed description, the appended claims and the several views illustrated in the accompanying drawings:

In the drawings:

FIGURE 2 is a schematic side elevational view of the molding machine of FIGURE 1 and illustrates the simultaneous injection molding of a parison and the blowing of an article when the platens are in a first position thereof, and a system for automatically controlling the molding machine.

FIGURE 3 is a fragmentary, schematic, side elevational view of the molding machine of FIGURES 1 and 2, and illustrates the platens in a second position thereof and the rotation of the rotatable portion of the first movable platen.

FIGURE 4 is an enlarged fragmentary sectional view taken along line 4—4 of FIGURE 1, and clearly illustrates the structural arrangement of the platens, a blow cavity of the second movable platen, a parison cavity of the stationary platen and a pair of oppositely directed cores carried by the rotatable portion of the first movable platen.

FIGURE 5 is an enlarged, fragmentary sectional view taken through the molding machine along a line substantially identical to the line 4—4 of FIGURE 1, but illustrates the relative positions of the components shown in FIGURE 4 when the platens are in a second relative position thereof and the cores have been drawn out of the cavities.

FIGURE 6 is an enlarged fragmentary sectional view taken along line 6—6 of FIGURE 1, and illustrates a plurality of cores carried by the rotatable portion of the first movable platen, means for rotating the rotatable portion, and manifold means for introducing temperature-control fluid and compressed air into the plurality of cores.

FIGURE 7 is a schematic elevational view of another molding machine constructed in accordance with this invention and generally illustrates various components thereof including a stationary platen, first and second movable platens, hydraulic means for moving the first and second movable platens with respect to the stationary platen, means for reciprocating a movable portion of the first movable platen, molding means carried by the platens and a system for automatically controlling the operation of the molding machine.

FIGURES 8 through 11 are schematic views of the molding machine of FIGURE 7, and graphically illustrate the successive steps performed during one molding cycle of the molding machine.

FIGURE 12 is a fragmentary sectional view of the molding machine of FIGURES 7 through 11 and illustrates the structural details of the molding machine including a blow molding cavity carried by each of the stationary and first movable platens, a parison mold cavity carried by the stationary platen, and a core carried by both the first and second movable platens.

Figure 13:
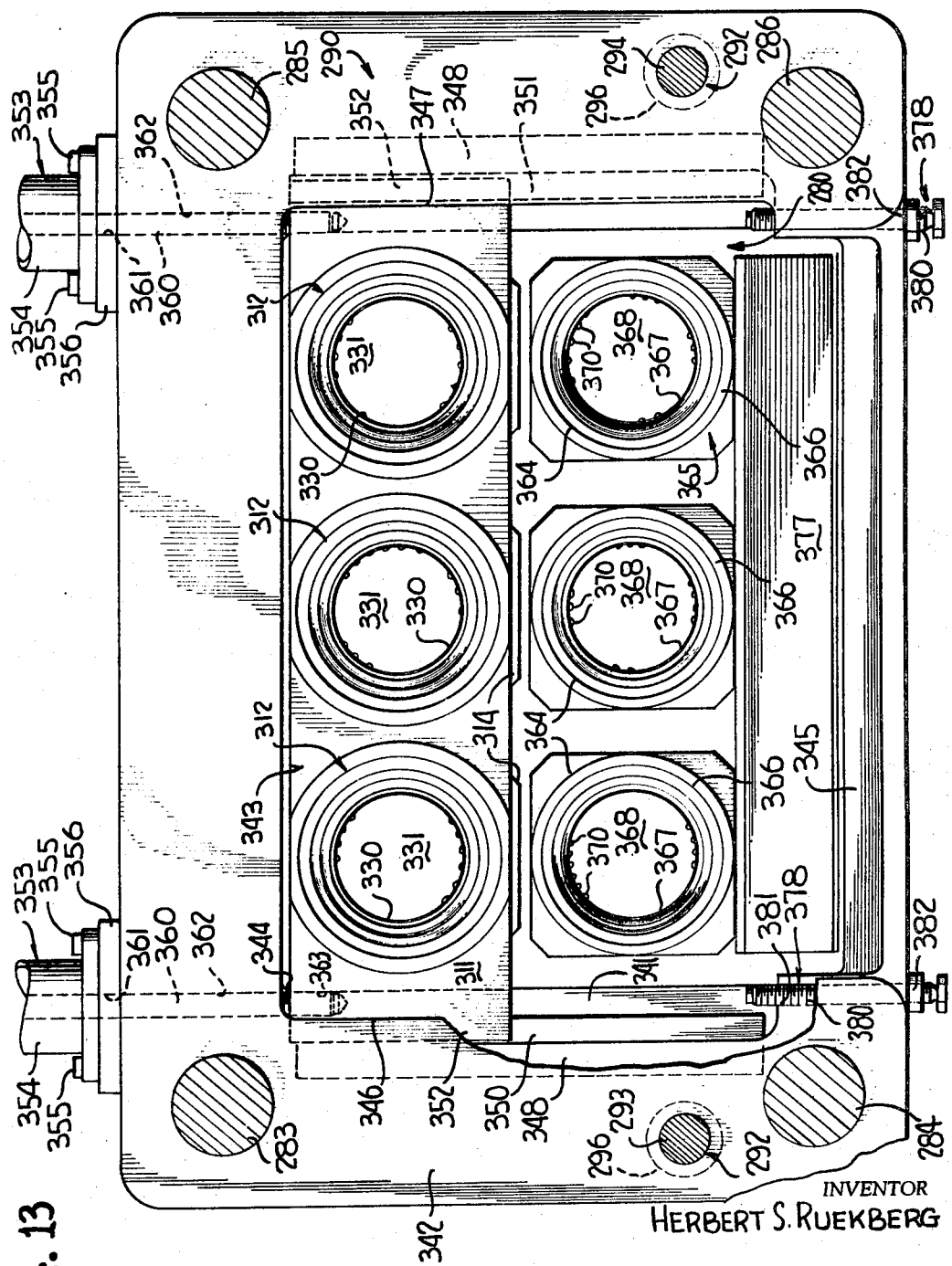

FIGURE 13 is a fragmentary elevational view with parts broken away for clarity, taken along line 13—13 of FIGURE 12 and more clearly illustrates the means for reciprocating the reciprocal portion of the first movable platen and adjustable stop means for limiting the movement of this reciprocal portion.

FIGURE 14 is an enlarged fragmentary sectional view of the pair of cores and cavities of FIGURE 4, and more clearly illustrates the position of these elements during an injecting and blowing operation of the machine.

FIGURE 15 is a schematic side elevational view of another molding machine, and illustrates rack and gear means for moving platens thereof between open and closed positions.

A molding machine constructed in accordance with this invention is illustrated in FIGURES 1 through 6 of the drawings, and is generally designated by the reference numeral 20. The molding machine 20 has an elongated, metallic base 21. An identical rail portion 22 on each side of the base 21 is adapted to secure the base 21 to a suitable supporting surface in a conventional manner, as for example, by mounting bolts passed through mounting apertures (not shown) in each of the rails 22, 22.

An upstanding support 23 (see FIGURES 1 and 4) is welded or otherwise conventionally secured normal to a horizontal top or mounting plate 19 of the base 21. The upstanding support 23 includes a substantially rectangular front plate 24 supported in opposed spaced relationship to a substantially rectangular rear plate 25 by bridging plates 26 and 27 welded between the front and rear plates 24 and 25 respectively. An identical aperture 28 is formed in each corner of the rectangular front plate 24 in axial alignment with an identical associated aperture 30 in each corner of the rectangular rear plate 25 (see FIGURE 4). An identical tubular sleeve 31 having a circular opening 32 is suitably secured in the aligned apertures 28 and 30 of the plates 24 and 25.

A second upstanding support or stationary platen 33 is secured to the base 21 at an injection end or area 34 of the molding machine 20. The stationary platen 33 comprises a substantially rectangular front plate 35 secured in spaced relationship to a similar substantially rectangular rear plate 36 by a plurality of bridging plates 37, 38 welded between the front and rear plates 35 and 36 respectively. An identical aperture 40 is formed in each corner of the front plate 35, and a similar, identical aperture 41 is formed in each corner of the rectangular rear plate 36 of the stationary platen 33. An identical tubular sleeve 42 having a circular opening 43 is secured between the apertures 40 and 41 in each corner of the plates 35 and 36, in a conventional manner clearly illustrated in FIGURE 4 of the drawings. The circular opening 43 in each of the sleeves 42 is in axial alignment with an associated circular opening 32 of the tubular sleeves 31 secured to the upstanding support 23.

One of four identical, cylindrical tie rods 44–47 is secured between each of the circular openings 32, 43 in the respective tubular sleeves 31, 42 by an identical annular locking ring or collar 48 and radial set screw 50 (see FIGURE 4) in a manner well known in the art. The cylindrical tie bars 44–47 form guide means for a first movable platen 51 and a second movable platen 52 reciprocally mounted on the tie rods 44–47 between the upstanding supports 23 and 33 in a manner to be described immediately hereafter.

The first movable platen 51 comprises a generally inverted U-shaped front plate 53 (see FIGURE 6) and a substantially identical inverted U-shaped rear plate 54. The inverted U-shaped front and rear plates 53 and 54 respectively, are secured together by a plurality of bridging plates 55 through 61 (see FIGURES 4–6) welded between the front plate 53 and the rear plate 54. Four identical apertures 62 are formed in each of the plates 53 and 54 of the first movable platen 51 in axial alignment with the apertures 28, 30 of the upstanding support 23 and the apertures 40, 41 of the second upstanding support or stationary platen 33.

A tubular sleeve 63 having a circular opening (unnumbered) is secured in the apertures 62, 62 of the plates 53 and 54 in a conventional manner. One of the tie rods 44–47 is guidably received through an associated circular opening (unnumbered) of each of the tubular sleeves 63, thereby journalling the first movable platen 51 for reciprocal linear movement upon the tie bars 44–47 in a manner to be described more fully hereafter.

The second movable platen 52 comprises a substantially rectangular, upstanding front plate 64 and a substantially identical, rectangular, upstanding rear plate 65. Four bridging plates 66–69 are secured between the front plate 64 and the rear plate 65 by welding, and thus maintain the plates 64 and 65 in spaced parallel relationship, as is best illustrated in FIGURES 4 and 5 of the drawings. An aperture 70 is formed in each corner of each of the substantially rectangular plates 64 and 65 of the second movable platen 52 in substantially axial alignment with associated apertures 28, 30 of the upstanding support 23, apertures 62, 62 of the first movable platen 51 and apertures 40, 41 in the stationary platen 33. A tubular sleeve 71 having a circular opening 72 is secured in each of the openings 70, 70 in each corner of the second movable platen 52. An associated one of the four tie bars 44–47 is each received in an associated one of the sleeves 71 there- by journalling the second movable platen 52 for reciprocal linear movement upon the tie bars 44–47 by a hydraulic movement impartiing mechanism 73 (FIGURES 1–5).

The hydraulic mechanism 73 comprises a cylindrical housing 74 secured to the top plate 19 of the base 21 by a plurality of identical mounting bolts 75 passes through openings (unnumbered) in a pedestal portion 76 of the housing 74 in a conventional manner. A peripheral flange 77 of the cylindrical housing 74 is secured to the front plate 24 of the upstanding support 23 by bolts 78. A piston 80 is mounted in the cylindrical housing 74. A rod 81 of the piston 80 projects through a pair of identical axially aligned openings 82 in the rectangular plates 24 and 25 of the upstanding support 23, only one such opening being illustrated in FIGURE 4 of the drawings. The rod 81 of the piston 80 terminates in a peripheral flange 83, and is secured to the front plate 64 of the second movable platen 52 by a plurality of bolts 84 and nuts 85, in a manner clearly illustrated in FIGURES 4 and 5 of the drawings.

Figure 1:
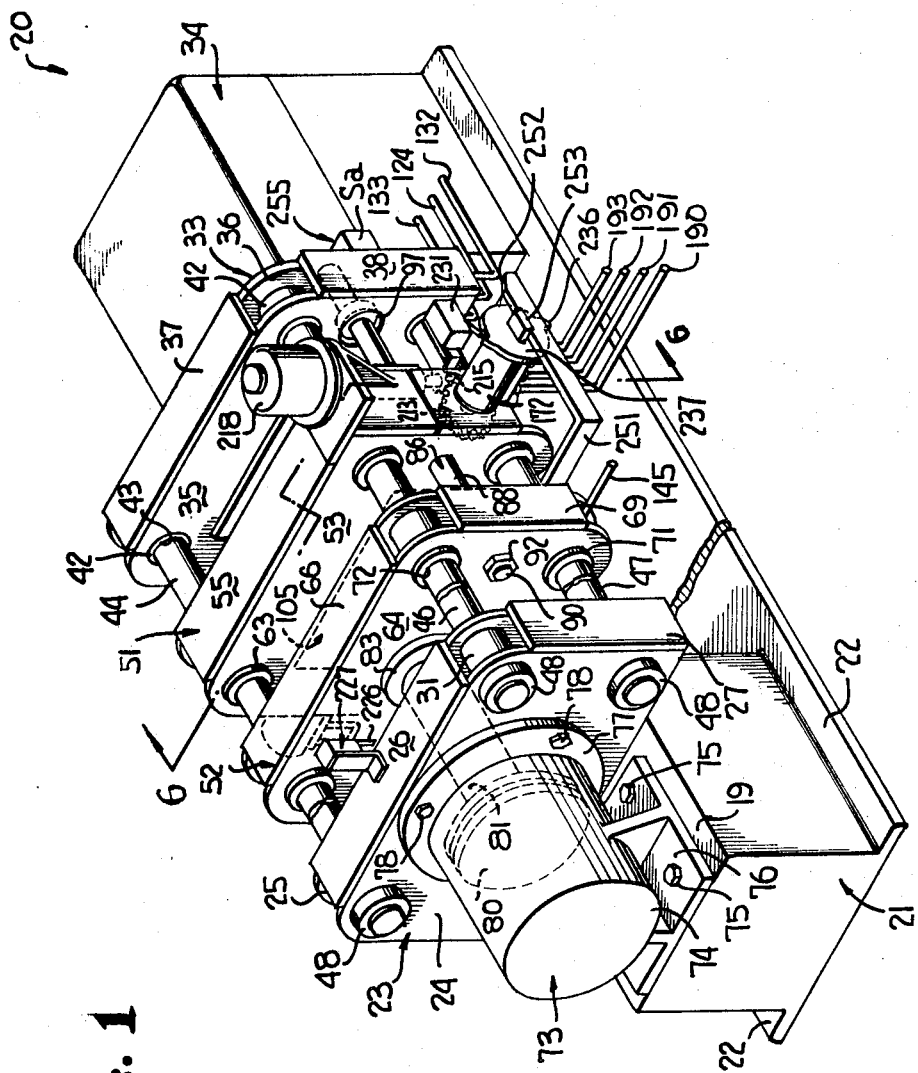
FIGURE 1 is a fragmentary top perspective view of a molding machine constructed in accordance with this invention, and generally illustrates various components of the machine including a stationary platen, first and second movable platens, hydraulic means for moving the first and second movable platens, and means for actuating a rotatable portion of the first movable platen.

As the piston 80 moves from right-to-left as viewed in FIGURE 1, the second movable platen is moved in this same direction in an obvious manner, and is guided during this movement by the tie bars 44–47. Reverse movement of the piston 80 imparts left-to-right movement to the second movable platen 52 in a similarly obvious manner.

The hydraulic mechanism 73 also moves the first movable platen 51. The first movable platen 51 is secured to the second movable platen 52 by a pair of identical lost-motion mechanisms 86 and 87. Each of the lost-motion mechanisms 86 and 87 comprises an identical, cylindrical, elongated, draw bar 88. The draw bar 88 of the lost-motion mechanism 87 is positioned substantially halfway between the tie bars 44 and 45 (see FIGURE 6) and is in parallel relation thereto. The draw bar 88 of the lost-motion mechanism 86 is similarly positioned substantially halfway between the tie bars 46 and 47 (FIGURES 1 and 6) and is also arranged in parallel relationship to these tie bars. An end portion 90 of each of the draw bars 88, 88 is received in a pair of axially aligned openings 91, 91 in each of the plates 64, and 65 of the second movable platen 52. (FIGURE 4).

A pair of nuts 92, 92 each arranged on opposite sides of the plates 64 and 65 secure the end portion 90 of each of the draw bars 88 to the second movable platen 52 in a manner clearly illsutrated in FIGURES 4 and 5 of the drawings.

Each of the draw bars 88 of the lost-motion mechanisms 86 and 87 projects through aassociated pairs of aligned openings 93, 93 formed in the front plate 53 and back plate 54 of the first movable platen 51 (FIGURE 6). An end portion 94 of each of the draw bars 88 opposite the end portion 90 is provided with an annular split-collar 95 having a screw 96 for locking the split-collar 95 in any selected position thereof on the end portion 94 of each of the draw bars 88.

An enlarged, circular opening 97, 97 is formed in the plates 35 and 36 of the stationary platen 33 in axial alignment with the openings 93, 93 of the first movable platen 51. The enlarged openings 97, 97 provide access openings in the stationary platen 33 for the receipt of the end portion 94 and split-collar 95 when the draw bars 88 are moved from the position illustrated in FIGURE 5 to the position illustrated in FIGURES 1 and 4.

When the piston 80 of the hydraulic mechanism 73 is moved from right-to-left as viewed in FIGURE 1 of the drawings, the rod 81 first moves the second movable platen 52 from right-to-left in the same figure, thereby drawing or moving each of the draw bars 88 of the lost-motion mechanisms 86 and 87 in an identical direction. During this initial movement of the second movable platen 52, the split-collars 95 are drawn through an associated one of the openings 97 in the stationary platen 33 until each of the split-collars 95 abuts the back plate 54 of the first movable platen 51. Prior to the abutment of the split-collars 95 against the back plate 54 of the first movable platen 51 no movement of this latter platen is effected by the movement of the second movable platen 52. However, after the split-collars 95 abut the back plate 54 of the first movable platen 51, continued movement from right-to-left of the draw bars 88, as viewed in FIGURE 4 of the drawings, draws the first movable platen from the position illustrated in FIGURE 4 to the position thereof shown in FIGURE 5.

The hydraulic mechanism 73, rod 81 and draw bars 88 cooperate with the tie bars 44–47 for guidably reciprocating the movable platens 51 and 52 in aligned relationship along a substantially linear path between the positions shown in FIGURES 4 and 5 of the drawings for a purpose to be more fully described hereafter.

First molding means 100 (FIGURES 4 and 5) for molding a parison P are cooperatively arranged between the stationary platen 33 and the first movable platen 51.) Second molding means 101 for forming a substantially, hollow article A from a parison are similarly arranged between the first movable platen 51 and the second movable platen 52. The first molding means 100 comprises a plurality of first mold sections 102 (only one of which is shown) arranged transversely of and secured to the front plate 35 of the stationary platen 33 by bolts 103 and a plurality of second mold sections or cores 104 carried by a movable portion or core assembly 105 of the first movable platen 51. The second molding means 101 similarly comprises a plurality of first mold sections 106 (only one of which is shown) arranged transversely of and secured to the back plate 65 of the second movable platen 52 by bolts 107, and a plurality of second mold sections or cores 108 (see FIGURE 6) carried by the movable core assembly 105 of the first movable platen 51.

Each of the first mold sections 102 of the first molding means 100 comprises an injection or parison mold body 110 having an axial sprue bushing 111 provided with an axial opening 112 defining a gate between an injection cavity 113 and an oppositely directed concavity 114 of the bushing 111. The injection cavity 113 is formed by a surface 115 of the bushing 111 and an insert 116 secured to the body 110 by a plurality of bolts 117 (only one of which is illustrated).

Flowable or heat-plasticized thermoplastic material M is injected into the cavity 113 of the injection mold 102 from a conventional plasticizing chamber (not shown) through an injection nozzle 118 projecting through axial aligned openings 120 and 121 in the respective front and rear plates 35 and 36 of the stationary platen 33. This injection of the thermoplastic material M is controlled by a mechanism which will be hereafter described more fully, and occurs when the platens 33, 51 and 52 are in the positions shown in FIGURE 4 of the drawings.

The temperature of each of the injection cavities 113 is controlled by circulating a suitable temperature control fluid or fluid coolant through channels 122 and 123 between the insert 116 and body 110 of each of the injection molds 102. Temperature control fluid is introduced into the channel 122 from a suitable reservoir by a conduit 124 (FIGURE 1), a transversely extending port 126 in a header 127 of the stationary platen 33, and a port 128. Temperature control fluid is removed from the injection mold by a port 130 between the channel 123 and transversely extending port 131 in the header 127 in fluid communication with a return conduit 132 (see FIGURE 1).

Air is introduced into the injection cavity 113 in a manner to be described more fully hereafter from a suitable source of compressed air (not shown) through a conduit 133 (FIGURE 1), a transversely extending port 134 in the header 127, a port 135, a circumferential groove 136 in the bushing 111 and an annular gap 137 between the insert 116 and the bushing 111.

Each of the first mold sections 106 of the second molding means 101 comprises a mold body 140 defining a blow mold cavity 141 contoured to the general configuration of the molded article A. A vent plug 142 carried by the body 140 permits the venting of the cavity 141 during a blow cycle, to be described hereafter, by the escape of air through a substantially annular gap 143, a circular recess 144 in the plate 65 of the second movable platen 52 and a conduit 145 (FIGURES 1, 4 and 5).

The plurality of cores 104 and 108 of the respective first molding means 100 and second molding means 101 are secured to the core assembly 105 in axial alignment with associated ones of the cavities 113 and 141 in a manner best illustrated in FIGURES 4, 5 and 6 of the drawings. The core assembly 105 comprises a substantially rectangular front plate 146 (FIGURE 6) secured to an inverted C-shaped rear or back plate 147 by a plurality of bolts 148 to define therebetween a substantially rectangular chamber 150. End plates 151 and 152 (see FIGURE 6) close the end portions of the chamber 150, and in conjunction with tubular sleeves 153 and 154 (FIGURE 6) mount the core assembly 105 for rotation in the first movable platen 51, in a manner to be described more fully hereafter.

A sleeve 155 (FIGURES 4 and 14) is mounted for limited axial sliding movement in a pair of identical apertures 156, 156, in each of the plates 146 and 147 of the core assembly 105 for a purpose to be described hereafter in the consideration of a molding cycle of the machine. An axially apertured frusto-conical insert 157 is carried by end portions of the sleeve 155 in a frusto-conical chamber 158 between the front plate 146 and the core 108. A similar axially apertured frusto-conical insert 160 is also carried by the sleeve 155 in a frusto-conical chamber 161 between the back plate 147 and the core 104. The core 104 is keyed at 162 to a headed bolt 163 passing through the sleeve 155 and threadably connected at 164 to the core 108.

A temperature control fluid header 165 and an air header 166 (see FIGURE 6) are arranged in the chamber 150 to supply both temperature control fluid and air to each of the cores 104 and 108 of the core assembly 105. The temperature control fluid header 165 comprises a pair of inlet conduits 167, 168 and a pair of outlet conduits 170 and 171. The left end portions of the conduits 167, 168 and 170 and 171 (as viewed in FIGURE 6) are closed while the right end portions of these conduits (as viewed in the same figure open into a union 172 carried by the plate 58. The inlet conduit 167 is placed in fluid communication with a circumferential temperature control fluid chamber 174 in each of the front and back plates 147 adjacent the peripheral edge of the cores 104 and 108 by a conduit 173. Temperature control fluid is removed from each of the circumferential temperature control fluid chambers 174 by means of a conduit 176 and a conduit 177 connected to the outlet conduit 171. Temperature control fluid is also introduced into each of the cores 104 and 108 of the core assembly 105 by means of the inlet conduit 168 which is connected by suitable conduits to circumferential channels 175 in the frusto-conical inserts 157 and 160 in a manner clearly illustrated in FIGURES 4 and 5 of the drawings, and withdrawn from each of the cores 104 and 108 through a conduit 170 in an almost identical manner as that heretofore described, and in a manner clearly illustrated in FIGURES 4 and 5 of the drawings. It will be apparent that with this arrangement temperature control fluid at one temperature can be supplied to the circumferential chambers 174 and temperature control fluid at another temperature can be supplied to the circumferential channels 175.

The union 172 (FIGURE 6) surrounds an end portion 178 of the tubular journal or sleeve 154 and is provided with four internal circumferential grooves 180–183. The circumferential grooves 180–183 are placed in fluid communication with a respective fluid chamber 184–187 by a plurality of identical radial ports 188 in the end portion 178 of the sleeve 154. The conduit 171 opens into the chamber 184 while the conduit 170 opens into the chamber 186. The inlet conduit 168 is in fluid communication with the chamber 185 while the inlet conduit 167 is in fluid communication with the chamber 187. Four conduits 190–193 are threadably secured to the journal 172 and are in respective fluid communication with the chambers 184–187. The conduits 190 and 192 are fluid outlet conduits, while the conduits 191 and 193 are fluid inlet conduits. Temperature control fluid from a suitable source is introduced through the conduit 191 into the chamber 185 and through the inlet conduit 168 to the circumferential channels 175 of the cores 104 and 108 of the core assembly 105. After the fluid has circulated through each of the cores 104 and 108 in the manner heretofore described, the fluid returns through the outlet conduit 170, the chamber 186 and the conduit 192 to a suitable reservoir (not shown). Temperature control fluid which is preferably at a lower temperature is similarly introduced through the conduit 193, the chamber 187, through the inlet conduit 167 and is circulated through each of the circumferential temperature control fluid chambers 174 encompassing the cores 104 and 108. After circulating through each of the chambers 174, this fluid also returns to a reservoir (not shown) through the conduits 171, chamber 184 and conduit 190.

The air header 166 includes a conduit 194 for communicating air under pressure to each of the plurality of cores 104 and a conduit 195 for communicating compressed air to each of the cores 108. Righthand end portions of the conduits 194 and 195 (as viewed in FIGURE 6) are closed while lefthand end portions 196, 197 of these respective conduits pass through the tubular journal or sleeve 153 of the core assembly 105. The end portions 196 and 197 open into respective chambers 200, 201 of a union 203. The union 203 is substantially identical to the union 172 and a description of the former is deemed unnecessary for a complete understanding of this invention. However, compressed air from a suitable source is introduced through each of two conduits 204, 205 into the chambers 200 and 201 respectively.

Air is communicated from the conduit 195 to each of the cores 108 by a conduit 206, a bore 207, and then through a circumferential slot 208 between the front plate 146 and each of the cores 108. Compressed air is introduced by the conduit 194 to each of the cores 104 in a manner substantially identical to that described, and further elaboration is considered unnecessary.

Referring to FIGURE 6 in particular, the core assembly 105 is journalled for rotation about the axis of the sleeves 153 and 154 thereof. The sleeve 153 of the core assembly 105 is journalled in a bushing 210 secured in a conventional manner between the bridging plates 56 and 61 of the first movable platen 51. The sleeve 154 is similarly journalled in a bushing 211 secured to the bridging plate 59, and through a gear housing 212, to the bridging plate 58. A helical gear 213 is keyed at 214 to the end portion 178 of the sleeve 154. The helical gear 213 is in mesh with a helical gear 215 at a 90° angle thereto (see FIGURE 1) carried by a shaft 216 coupled by an electric clutch 217 to a continuously rotating gear motor 218 secured to a reinforced end portion 220 of the bridging plate 55. By selectively energizing the electric clutch 217 in a manner to be described hereafter, rotation is imparted to the core assembly 105.

A control system 225 (FIGURE 2) of the molding machine 20 will be best understood by describing a molding cycle of the molding machine, and attention is directed primarily to FIGURES 1, 4, 5 and 6 of the drawings.

Assuming that the movable platens 51 and 52 are moving from right-to-left between the closed position shown in FIGURES 1, 2 and 4 to the opened position of FIGURES 3 and 5, and that a parison P and an article A have been respectively injection molded and blow molded during a previous machine cycle, the second movable platen 52 contacts an arm 226 of a switch 227 mounted in a conventional manner on the upstanding support 23 (see FIGURE 1). The switch 227 closes a circuit traced from a source of electrical potential (not shown) over a conductor 228, a switch arm 230 of a switch 231 secured to the first movable platen 51 (FIGURE 1), a conductor 232, the electric clutch 217, a conductor 233, a conductor 234, the closed switch 227 and a conductor 235. This circuit energizes the electric clutch 217 causing rotation of the helical gear 215 by the continuously rotating gear motor 218. The helical gear 215 rotates the helical gear 213 in a counterclockwise direction (FIGURE 3) to rotate the core assembly 105 of the first movable platen 51 in a counterclockwise direction. As the core assembly 105 approaches 180 degrees of rotation, the switch 231 is opened by a cam lobe 236 of a cam 237 keyed or otherwise secured to the sleeve 154 of the core assembly 105 (FIGURE 6). When the switch arm 230 opens the previously traced circuit opens causing de-energization of the electric clutch 217 which in turn terminates rotation of the core assembly 105 when each of the cores 104 and an associated parison P have been brought almost but not quite into alignment with the blow mold cavities 141 of the second movable platen 52.

Prior to the opening of the molds and the rotation of the core assembly 105, compressed air is introduced into each of the parison cavities 113 in a conventional manner through the conduit 133 (FIGURE 1) the transverse conduit 134 (FIGURE 5), the conduit 135, the circumferential groove 136 in the bushing 111 and the gap 137 (also FIGURE 5) to free each parison P from an associated cavity 113 and insure that each parison is retained by an associated core 104.

Prior to approaching 180 degrees of rotation, each of the previously blown articles A are ejected from the cores 108 (see FIGURE 3) by the introduction of compressed air from a conventionally controlled source through the conduit 205 (FIGURE 6), the chamber 201, the conduit 195 of the air header 166, each of the conduits 206 and 207 (FIGURE 5), and the gaps 208 in each of the cores 108.

Simultaneously with the de-energization of the electric clutch 217, the same cam lobe 236 of the cam 237 urges the switch arm 230 of the switch 231 to a second position closing a circuit traced by the conductor 228, switch 230, a conductor 240, a coil 241 of a solenoid-operated spool valve 242, a conductor 243, the conductor 234, the closed switch 227 and the conductor 235. The coil 241 urges a valve 244 of the spool valve 242 to the position illustrated in FIGURE 2. A pump 245 pumps fluid from a reservoir 246 into the cylinder or housing 74 of the hydraulic mechanism 73 by a conduit 247, a passage 248 in the valve 244 and a conduit 250. This moves the piston 80 of the hydraulic mechanism 73 from left-to-right as viewed in FIGURE 2 toward the completely closed position of the platens 33, 51 and 52 shown in the same figure.

As the second movable platen 52 is moved toward the closed position thereof by the piston 80 and rod 81, an angular L-shaped bracket 251 (FIGURES 1 and 2) carried by the second movable platen 52 approaches the cam 237 carried by the sleeve 158 of the core assembly 105. A cam portion 252 of the bracket 251 contacts an axial projection 253 of the cam 237. The cores 104 and 108 and the cavities 113 and 141 are not quite brought all the way into exact axial alignment at the time the electric clutch 217 is de-energized to stop rotation of the core assembly 105, leaving the switch arm 230 still on the cam lobe 236. The cam portion 252 bearing against the axial projection 253 of the cam 237 urges the cores 104 and 108 counterclockwise into alignment with the cavities 113 and 141 in a manner clearly illustrated in FIGURES 1, 2 and 6 of the drawings. During this final alignment the switch arm 230 drops off of the cam lobe 236 putting the switch 231 in circuit with the electric clutch 217 which is not caused to be activated, since at this time, the switch 227 is open and prevents the completion of the energizing circuit through the electric clutch 217.

Each of the cores 108 is now positioned in an associated injection cavity 113 while each of the cores 104 with a parison P' thereon is in each of the blow cavities 141 (FIGURE 2).

During the closing of the molds 100 and 101, the second movable platen 52 also moves the lost-motion mechanisms 86 and 87 from left-to-right between the position shown in FIGURE 5 to the position shown in FIGURE 4. As the end portion 94 of the draw bar 88 of the lost-motion mechanism 86 passes through the aligned openings 97, 97 (FIGURES 1 and 5) of the stationary platen 33, the end portion 94 closes a switch 255 carried by the stationary platen 33 by contacting and moving a switch arm 256 thereof, as is clearly illustrated in FIGURE 2 of the drawings. This closes a circuit from external source of potential energy (not shown) over a conductor 257, through a conventional timer or time delay mechanism T, a conductor 258, the switch arm 256 and a return conductor 260. After a predetermined time delay, the timer T energizes a solenoid S of a valve V of a conventional injection mechanism I over a circuit traced by a conductor 262, the timer T, a conductor 263, the solenoid S, a conductor 264, the timer T and a conductor 265. This opens the valve V and pressurized heat-plasticized material M (FIGURE 4) is injected by each of the injection nozzles 118 into each of the injection cavities 113 through the gates 112. In this manner, another parison is injection molded in each of the injection cavities 113.

An important aspect of this invention is the action of the cores 104, 108 during the injection molding of a parison in each of the injection cavities 113 and the corresponding blowing of the parisons to form articles in the blow cavities 141. As is best illustrated in FIGURE 14 of the drawings, the pressurized heat-plasticized material M injected by each of the injection nozzles 118 into each of the injection cavities 113 through the gates 112 acts against the cores 104 causing limited right-to-left sliding movement thereof and corresponding movement of the sleeves 155 and the cores 108. This sliding movement closes the circumferential gaps 208 adjacent the injection cavities 113 by the contact between opposed circumferential faces or surfaces (unnumbered) of the cores 104 and the plate 147. The material M thus injected into the injection cavities 113 to form the parisons is prevented from blocking the circumferential gaps 208 which would otherwise occur in the absence of this noted sliding movement of the cores 104, 108 and the sleeve 155. This same sliding movement correspondingly opens the circumferential gaps 208 adjacent the blow cavities 141 and air under pressure rapidly and efficiently blows each parison to form the finished articles. It will also be readily apparent that upon the rotation of the core assembly 105 to bring the cores 108 into alignment with the injection cavities 113 and the cores 104 into alignment with the blow cavities 141, the subsequent injection of the pressurized, plasticized material M into the injection cavities 113 will again cause right-to-left movement which, in this instance, closes the circumferential gaps 208 defined by circumferential opposed faces (unnumbered) of the cores 108 and the plate 146 and opens the circumferential gaps adjacent the blow cavities 141. This sliding movement continues during the repetitious cycling of the machine to prevent blockage of the circumferential gaps 208 during each injection of the material M into the injection cavities 113.

During the injection of the material M into the cavities 113, the cores 104 and 108 each shift to the left as viewed in FIGURE 4 of the drawings under the influence of the injection pressure applied against the cores 104.

Simultaneously with the injection operation above described a valve or suitable control mechanism (not shown) between a source of compressed air (not shown) and the conduit 204 (FIGURE 6) is actuated. This causes compressed air to flow through the conduit 204, the chamber 200, the portion 196 of the air header 194 and through each of the cores 104 (now in alignment with an associated one of each of the blow mold cavities 141) through the open circumferential gaps 208 (FIGURE 4) to blow the previously formed parison P in a conventional manner to form another article thereon in each of the blow mold cavities 141. During the blow molding of these articles from each of the previously formed parisons, air is drawn from the blow mold cavities 141 by means of the gaps or ports 143 (FIGURE 4) between each vent plug 142 and body 140, the chamber 144 and the conduit 145 in a conventional manner. It is to be understood that the conduit 145 is selectively connected to a source of vacuum and a source of air under pressure. Vacuum is drawn through the conduit 145 on the blow mold cavities 141 during the blow molding of articles therein. Then, just before opening the molds after the articles have been formed, compressed air is back fed into the cavities 141 through the ports 143 to force the formed articles to stay on the cores 104, when the molds 100 and 101 are opened.

The timer T then de-energizes the solenoid S and energizes a coil 270 of the spool valve 242 over conductors 271, 272 after the parisons have been molded and the previously molded parisons have been formed into articles. The timer T also shuts off the blowing air to the cores 104 and vents the cores to the atmosphere. The coil 270 of the spool valve 242 draws the valve 244 downwardly, as viewed in FIGURE 2, and fluid is pumped by the pump 245 from the reservoir 246 to an area behind the piston 80 through the conduit 247, the passage 248, and a conduit 273. This moves the piston 80, rod 81 and second movable platen 52 from right-to-left as viewed in FIGURE 2 of the drawings from the position of FIGURE 4 to the position of FIGURE 5. During this initial movement of the second movable platen 52, the first movable platen 51 remains temporarily stationary until such time as the locking ring 95 secured to each of the draw bars 88 contacts the back plate 54 (FIGURES 4 and 5) of the first movable platen 51. After this contact the first movable platen 51 is drawn along with the second movable platen 52 in the manner heretofore described to the open position thereof, as is best illustrated in FIGURE 5 of the drawings. This movement of the second movable platen 52 again causes it to contact the switching arm 226 of the switch 227, resulting in the energizing of the clutch 217 and the rotation of the core assembly 105 as previously explained.

During operation of the molding machine just described, temperature control fluid from separate sources constantly flows through the chamber 174 and the channels 175 of the cores 104 and 108. The temperature control fluid in the chambers 174 is preferably kept cooler than the fluid in the channels 175. The reason for this is because the temperature control fluid channels 175 maintain the body portion of a parison P at the proper temperature to be blow formed. However, it is desirable to have the mouth or rim portion of the parison that is not blown at a lower temperature so that it will set up faster, giving it greater immediate strength. Hence, the fluid in the chambers 174 that controls the temperature of the rim of the parison is normally maintained cooler.

Another molding machine constructed in accordance with this invention is illustrated in FIGURES 7 through 13 of the drawings, and is generally designated by the reference numeral 275. The molding machine 275 is similar in function and structure to the molding machine 20 of FIGURES 1 through 6 of the drawings, and has a base 276 fragments of which are shown in FIGURE 7. The base 276 is substantially identical to the base 21 of FIGURE 1. An upstanding support 278 (illustrated schematically in FIGURE 7), similar to the upstanding support 23 of the molding machine 20, is secured in a conventional manner to the base 276 of the molding machine 275.

A stationary platen 280 (FIGURE 12) is secured to the top of the base 276 by a plurality of mounting bolts 281, only one of which is shown in FIGURE 12. The stationary platen 280 of the molding machine 275 is substantially identical to the stationary platen 33 of the molding machine 20, and has a plurality of conical concavities 281 through which project a plurality of injection nozzles 282, only one of which is shown. The stationary platen 280 is secured to the upstanding support 278 by four tie bars 283–286 (FIGURE 13) only two of which are shown in FIGURES 7 and 12 of the drawings. Reduced end portions 287 of the tie bars 283–286 are secured to the upstanding support 278 and the stationary platen 280 by any conventional means, as for example, by identical nuts 288 threaded to the threaded end portions of the tie rods.

First and second movable platens 290 and 291 respectively, are mounted for substantially linear, reciprocal movement upon the tie bars 283–286 in a manner substantially identical to that heretofore described in the consideration of the movable platens 51 and 52 of the molding machine 20, and a further description is deemed unnecessary for a complete understanding of this invention. The first movable platen 290 is also secured to the second movable platen 291 by a lost-motion mechanism 292 comprising a pair of draw bars 293 and 294 (FIGURE 13). Each of the draw bars 293 and 294 is identical and comprises a cylindrical rod having a reduced, threaded end portion 295 (FIGURE 12) secured to the first movable platen 290 by an identical associated nut 296. An opposite end portion of each of the draw bars 292 and 293 is reciprocally journalled for sliding motion in a sleeve (not shown) of the second movable platen 291 secured in an aperture 297 of the same. Each of the draw bars 293 and 294 is provided with an identical, cylindrical head 298.

The second movable platen 291 is reciprocated by a hydraulic mechanism 300 (schematically shown in FIGURE 7) secured in a conventional manner to the upstanding support 278. The hydraulic mechanism 300 is identical, for purposes of this invention, to the hydraulic mechanism 73 of the molding machine 20, and includes a hydraulic cylinder 301, a piston 302 and a piston rod 303 passed through an axial bore 304 in the upstanding support 278 (FIGURE 7). The piston rod 303 of the hydraulic mechanism 300 terminates in a circumferential flange 305 which is secured to the second movable platen 291 by a plurality of bolts or similar conventional securing devices (not shown).

As the piston 302 is reciprocated in the hydraulic cylinder 301 of the hydraulic mechanism 300 in a manner to be described more fully hereafter, the piston rod 303 reciprocates the second movable platen 291, and through the pair of draw bars 293 and 294, motion is imparted to the first movable platen 290 in a manner substantially identical to that heretofore described in the consideration of the molding machine 20.

First molding means 306 (FIGURE 12) for molding a parison P are cooperatively arranged between the stationary platen 280 and the first movable platen 290. Second molding means 307 for forming a substantially, hollow article A from a parison are similarly arranged between the first movable platen 290, and the second movable platen 291. The first molding means 306 comprises a plurality of first mold sections 308 (only one of which is shown) arranged transversely of and secured to the stationary platen 280 in a conventional manner, and a plurality of second mold sections or cores 310 carried by a movable portion or reciprocal core and cavity assembly 311 of the first movable platen 290. The second molding means 307 similarly comprises a plurality of first mold sections 312 (only one of which is shown) arranged transversely of and secured to the reciprocal core and cavity assembly 311 of the first movable platen 290 and a plurality of second mold sections or cores 313 secured in a conventional manner to the second movable platen 291.

Each of the first mold sections 308 of the first molding means 306 comprises an injection or parison mold body 314 having an axial sprue bushing 315 provided with an opening 316 to define a gate between an injection cavity 317 and the conical concavity 281 of the stationary platen 280. The injection cavity 317 is formed by a concave surface of the bushing 315 and a surface of an insert 318 secured to the body 314 by a plurality of bolts 320, only one of which is illustrated in FIGURE 12. Each mold body 314 is slidably mounted in a yoke 321 secured to the stationary platen 280. A plurality of circumferentially arranged springs 322 (only one of which is illustrated) normally urge a shoulder 323 of each of the bodies 314 into contact with a shoulder 324 of the yoke 321 between injection cycles of the molding machine 275. The springs 322 thus keep the bushings 315 out of engagement with the injection nozzles 282 between injection cycles. This is a desirable and novel arrangement as otherwise the tips of the injection nozzles 282 would be undesirably cooled by the bushings 315 which at the same time would be undesirably heated by the injection nozzles. It is to be understood that this novel arrangement may be substituted to advantage for the usual prior art practice shown and described in connection with the machine 20.

Temperature control fluid is introduced between the body 314 and insert 318 from a reservoir (not shown) through a conduit 325, and after circulating between the insert 318 and body 314 through channels (unnumbered), is returned by a conduit 326 to the reservoir in a manner well known in the prior art.

Just prior to the opening of the molds air is introduced into the injection cavity 317 from a suitable source of compressed air (not shown) through a conduit 327 and various ports and channels (unnumbered) in the body 314 and bushing 315 in order to urge the parison P to remain on the core in a manner substantially identical to that heretofore described during the consideration of the mold section 102 (FIGURES 4 and 5) of the molding machine 20.

Each of the first mold sections 312 of the second molding means 307 comprises a mold body 328 defining a blow mold cavity 330 contoured to the general configuration of a molded article A. A vent plug 331 carried by each of the bodies 328 permits the venting of each of the cavities 330 during a blow cycle of a molding machine 275 by the escape of air through a substantially annular gap 332 between the body 330 and the vent plug 331, a circumferential channel 333 in the vent plug 331, a port 334 in the body 330 and a conduit 335. Conduit 335 is preferably selectively connected to a source of vacuum and a source of compressed air. Vacuum is used to vent the cavities 330 during a blow molding operation while the compressed air is used to eject finished articles from the cavities 330.

The plurality of cores 310 and 313 of the respective first molding means 306 and second molding means 307 are secured to the first and second movable platens 290 and 291 respectively, in axial alignment with associated ones of the cavities 317 and 330. The cores 310 and 313 are substantially identical to the cores 104 and 108 of the first molding machine 20, and further description of the former is deemed unnecessary for a complete understanding of this invention. However, each of the cores 310, 313 includes a circumferential gap (unnumbered) corresponding to the gaps 208 of the machine 20 which are closed by the left-to-right sliding movement of the cores 310, 313 as a result of the pressure exerted by the hot plastic during the injection of parisons, and opened by right-to-left sliding movement of the cores caused by blowing air pressure during the blowing operation. Also, because the core and cavity assembly 311 is mounted for reciprocation upon the first movable platen 290, all conduits which introduce compressed air and temperature control fluid into each of the cores 310 are flexible, such as the single illustrated conduit 336 of FIGURE 12. Similarly, a plurality of conduits 337, 338 and 340 in fluid communication with each of the cores 313 are also of a flexible nature. The conduit 337 is connected to a suitable conventional source of compressed air (not shown) for purposes of blow molding an article in a manner to be described hereafter, while the conduit 338 is connected to a suitable conventional source of temperature control fluid for maintaining each of the cores 313 at a desired temperature for blow forming. The conduit 340 is the return conduit to a suitable fluid source. Other conduits (not shown) provide temperature control fluid to an annular chamber around the rim area of the parison P. This fluid is at a lower temperature for the reason priorly explained with respect to the first machine 20.

A primary difference between the molding machine 20 and the molding machine 275 is the respective constructions of the first movable platens 51 and 290. As has been heretofore described, the core assembly 105 of the molding machine 20 is rotatable about an axis substantially normal to the direction of movement of the platens 51 and 52 whereas the core and cavity assembly 311 of the molding machine 275 is mounted for reciprocation in a direction substantially normal to the direction of reciprocation of the movable platens 290 and 291 in a manner to be described immediately hereafter with particular attention directed to FIGURES 12 and 13 of the drawings.

The first movable platen 290 comprises a substantially inverted U-shaped front plate 341 secured in a conventional manner as by bolts (not shown) to a substantially rectangular back or rear plate 342. A substantially rectangular opening 343 defined by a top wall 344, an inclined bottom wall 345, and opposed side walls 346, 347 is formed in the rear plate 342 of the first movable platen 290. An identical recess or channel 348 (see FIGURE 12) in each of the opposed side walls 346 and 347 houses an identical pair of spaced guides 350 and 351.

The reciprocal core and cavity assembly 311 is substantially rectangular in outline and has a length slightly greater than the distance between the opposed side walls 346, 347 of the rear plate 342. Opposite end portions 352, 352 of the reciprocal core assembly 311 are reduced in section and each of these end portions is received between the pairs of inserts 350, 351 in the side walls 346 and 347. The inserts 350 and 351 confine the end portions 352, 352 and thereby guide the core and cavity assembly 311 for vertical reciprocation within the first movable platen 290.

The core and cavity assembly 311 is reciprocated by a pair of identical hydraulic mechanisms 353, 353. Each of these hydraulic mechanisms 353, 353 comprises a hydraulic cylinder 354 secured by bolts 355 to bridging plates 356 welded or otherwise secured to uppermost portions of the plates 341 and 342 of the first movable platen 290. A piston 357 (see FIGURE 7) is guided in a chamber 358 of each of the hydraulic cylinders 354. A piston rod 360 of each piston projects through axially aligned openings 361 and 362 in each of the respective bridging plates 356 and the rear plate 342 of the first movable platen 290. An identical end portion of each piston rod 360 is threadably secured in a threaded bore 363 adjacent each of the end portions 352, 352 of the core and cavity assembly 311.

When the pair of hydraulic mechanisms 353, 353 are actuated in a manner to be described hereafter, the core and cavity assembly 311, including the plurality of cores 310 and blow cavities 330 secured thereto, is reciprocated between a position in which the first and second molding means 306 and 307 are in axial alignment and another position in which the plurality of cores 310 of the core and cavity assembly 311 are each axially aligned with a first mold section or blow mold 364 of third molding means 365 secured to the stationary plate 280 beneath the first mold sections 314.

Each blow mold 364 of the third molding means 365 is identical to the blow molds 312 secured to the reciprocal core assembly 311 of the first movable platen 290. Each blow mold 364 comprises a mold body 366 having a blow cavity 367 contoured to the configuration of an article which is to be formed therein. The blow molds 364 each include an axial vent plug 368. A plurality of ports or gaps 370, a circumferential groove 371, a port 372 and a flexible conduit 373 vent each blow cavity 367 to a source of vacuum during a blow cycle of the molding machine 275 and eject an article blow molded therein by means of air pressure.

A temperature control fluid inlet conduit 375 and an outlet conduit 376 in communication with a conventional source or reservoir of temperature control fluid (not shown) maintains each of the blow cavities 367 at a preselected temperature by circulating the fluid through channels (unnumbered) in each of the blow molds 364 in a manner clearly illustrated in FIGURE 12 of the drawings.

An elongated inclined guide or chute 377 is welded or otherwise conventionally secured to the blow olds 364 of the third molding means 365 beneath the blow mold cavities 367 thereof in alignment with the inclined bottom wall 345 of the back plate 342 of the first movable platen 290 (FIGURE 12). The elongated chute 377 guides articles ejected from the blow cavities 367 through the substantially rectangular opening 343 in the rear plate 342 of the first movable platen in a manner clearly illustrated in FIGURE 12.

The core and cavity assembly 311 is limited in the downward reciprocation thereof (as viewed in FIGURES 12 and 13) by a pair of identical adjustable stop means 378, 378. Each of the adjustable stop means 378, 378 includes a bolt 380 threaded in a vertical threaded bore 381 of the rear plate 342. The bolts 380 are aligned for abutment with the core and cavity assembly 311, and thus limit the downward reciprocation thereof. A lock nut 382 carried by each bolt 380 locks each of the bolts 380 in a conventional manner in and adjusted position thereof.

Before a control system 385 of FIGURE 7 which controls the cycling of the molding machine 275 is described, attention is directed to FIGURES 8 through 11 of the drawings which schematically illustrate a cycle of the molding machine 275.

In FIGURE 8 of the drawings, the movable platens 290 and 291 have been moved from right-to-left to close the first and second molding means 306 and 307 with the cores 310, 313 and cavities 317, 330 in axial alignment. The injection nozzle 282 has injected heat-plasticized thermoplastic material in each of the cavities 317 to mold a plurality of parisons P (only one of which is shown) while an article A has been simultaneously blow molded from a previously molded parison in each of the blow cavities 330. One article $A^1$ of a plurality of articles previously blow-molded in each one of the blow cavities 367 of the third molding means 365 is shown being ejected therefrom. While the articles $A^1$ are shown being ejected during the time the platens 280, 290 and 291 are closed the ejection of the articles $A^1$ does not occur until just after the first and second molding means have been opened again by reciprocating the platens 290, 291 from left-to-right. This permits the articles $A^1$ to remain in the blow cavities 367 for a maximum time period during which the plastic material cools and sets whereby the articles $A^1$ retain their configuration after being ejected from the cavities 367.

After the operation just described, the respective first and second movable plates 290 and 291 are reciprocated from left-to-right to open the molding means 306 and 307, as is illustrated in FIGURE 9 of the drawings. The core and cavity assembly 311 of the first movable platen 290 is then reciprocated downwardly until each core 310 is in axial alignment with a blow cavity 367 of the third molding means 365. It should be particularly noted that the previously molded parisons P and formed articles A are also carried downwardly by the reciprocal core and cavity assembly 311.

The first movable platen 290 and the second movable platen 291 are then again reciprocated in a right-to-left direction from the positions shown in FIGURE 9 to the positions shown in FIGURE 10. This movement of the platens 290 and 291 brings the cores 313 carried by the second movable platen 291 into closed axial registration with the injection cavities 317 while the cores 310 of the reciprocal core and cavity assembly 311 are each projected into a blow cavity 367 of the third molding means 365. When so positioned, parisons $P^1$ are injection molded in the injection cavities 317 and articles $A^2$ are blow molded from previously molded parisons P. While the blown articles A are shown being ejected in FIGURE 10 of the drawings, this ejection preferably takes place after the platens 290, 291 are fully opened by left-to-right movement thereof. This affords a maximum time period during which the articles A cool and set.

The movable plates 290, 291 are then reciprocated left-to-right from the positions of FIGURE 10 until they are fully opened after which the core and cavity assembly 311 is reciprocated upwardly until the cores 310, 313 and cavities 317, 330 are again in axial alignment, as is shown in FIGURE 11 of the drawings. The parisons $P^1$ are retained on the cores 313 of the second movable platen 291 while the articles $A^2$ remain in the blow cavities 367 of the third molding means 365.

The cycle is completed after the movable platens 290 and 291 have been reciprocated from the position shown in FIGURE 11 to the position shown in FIGURE 8 whereupon additional parisons are injection molded in the cavities 317, the parisons $P^1$ are formed into articles in cavities 330 and the articles $A^2$ in the third molding means 365 are ejected after the platens 290, 291 are again opened.

It is to be understood that during each injection of plastic into the cavities 317 the injection nozzles 282 associated therewith will be in engagement with the sprue bushing 315 because the springs 322 (FIGURE 12) will be compressed by the core 310 or 313 exerting pressure against the parison mold body 314.

The operation of the molding machine 275 will be best understood by associating the machine cycle heretofore described in connection with FIGURES 8 through 11 with the system 385 of FIGURE 7 for sequentially controlling the various components of the molding machine 275 during one such cycle.

Assuming that the platens 280, 290 and 291 are in the positions shown in FIGURE 8 of the drawing, and that a plurality of first formed parisons (phantom outline in FIGURE 8) are carried by the cores 313 of the second movable platen 291 and first blown articles $A^1$ are still in the cavities 367 of the third molding means 365, the injection molding of the parisons P in the injection cavities 317 is initiated by the actuation of a conventional fluid-operated switch 386 of the control system 385 of FIGURE 7.

When the molding means 306 and 307 are closed by the hydraulic mechanism 300, fluid pressure in the cylinder 301 actuates the switch 386 through a conduit 387. The switch 386 starts a timer 388 over a conductor 390. The timer 388 in turn energizes a four-way solenoid valve 391 over a conductor 392 to supply fluid from a reservoir (not shown) through a conduit 393, the valve 391 and a conduit 394 to a hydraulic cylinder 395 of a plasticizing cylinder. A piston 396 is urged from left-to-right as viewed in FIGURE 7 of the drawings to inject heat-plasticized thermoplastic material through each of the injection nozzles 282 into each of the injection cavities 317 to mold the plurality of parisons P of FIGURE 8 (only one of which is shown).

Simultaneously with the injection of the parisons P, the previously molded parisons carried by the cores 313 of the first movable platen 291 are blow molded to form the articles A of FIGURE 8. The articles A are blow molded by venting each of the cavities 330 to a source of vacuum and introducing compressed air through each of the cores 313 to force the previously formed parisons to the configuration of the blow cavities 330.

Each blow cavity 330 is vented beginning with the actuation of the switch 386 which energizes a timer 397 over the conductor 390 and a conductor 398. The timer 397 activates a two-way solenoid operated valve 400 over a conductor 401. A conduit 402 coupled to the solenoid valve 400 is in fluid communication with a source of vacuum (not shown). Another conduit 403 is connected through a directional three-way solenoid operated valve 404 and a conduit 405 to the conduit 335 (see FIGURE 12) in communication with each blow cavity 330. Thus, air is exhausted from each of the blow cavities 330 over a path of fluid flow traced from each cavity 330, an associated circumferential gap 332 (FIGURE 12), circumferential groove 333, port 334, conduit 335, conduit 405, directional three-way solenoid operated valve 404, conduit 403, two-way solenoid operated valve 440 and the conduit 402 to the source of vacuum.

As each blow cavity 330 is vented, the timer 397 initiates the introduction of compressed air through each of the cores 313 of the second molding means 307 by energizing a two-way solenoid valve 400 over the conductor 401 and a conductor 407. Air from a suitable source of compressed air flows through a conduit 408, the three-way valve 406, a conduit 410, a directional valve 411, a conduit 412 to the conduit 337 (FIGURE 12) and through each of the cores 313 in a conventional manner to urge each of the parisons to the general configuration of the blow mold cavities 330 to form the articles A.

After the parisons P and articles A have been respectively injected and blown in the respective cavities 317 and 330, the timer 388 de-activates, or times out, actuating the four-way solenoid valve 391 to supply fluid to the opposite end of the piston 396 of the hydraulic cylinder 395 over a fluid path traced by the conduit 393, the valve 391 and a conduit 413 to move the piston 396 from right-to-left to the position illustrated in FIGURE 7.

The timing out or running out of the timer 388 actuates a timer 414 over a conductor 415 to initiate, after the time delay period has run, the opening of the molding means 306 and 307 by reciprocation of the movable platens 290 and 291 in a manner to be described hereafter.

Shortly after the molding means 306 and 307 begins opening, the timer 397 times out and actuates the two-way solenoid operated valve 406 over a conductor 416 and 417. This shuts off the compressed air to the cores 313.

The running out of the timer 397 also closes the two-way solenoid valve 406 by the conductor 416 and a conductor 420 to close off the course of vacuum supply through the conduit 402. By thus keeping the vacuum on and also the compressed air until after the molding means 306 and 307 start opening it is assured that the blown articles A will remain in the cavities 330.

The plurality of articles $A^1$ (FIGURE 8) are ejected from the blow cavities 367 of the third molding means 365 by the operation of a two-way solenoid valve 421 over the conductor 416 from the timed out timer 397, after the molding means 306 and 307 are fully opened.

Compressed air is introduced into each of the blow cavities 367 from a suitable source of compressed air (not shown) over a conduit 422, the valve 421, a conduit 423, a directional valve 424 and the flexible conduit 373 communicating with each of the blow cavities 367 in a manner heretofore described and clearly illustrated in FIGURE 12 of the drawings. As the articles $A^1$ are ejected from the plurality of blow cavities 367, the inclined chute 377 (FIGURE 12) guides each of the ejected articles $A^1$ through the opening 343 in the rear plate 342 of the first movable platen 290.

The movement of the platens 290 and 291 to the position illustrated in FIGURE 7 is initiated by the timer 414 previously actuated over the conductor 415 from the timed out timer 388 in the manner heretofore described. The timer 414 actuates a four-way solenoid valve 425 over a conductor 426 and a conductor 427. The valve 425 is now positioned to permit the introduction of fluid into the chamber 301 of the hydraulic mechanism 300 from a suitable source of fluid under pressure through a conduit 429, the valve 425 and a conduit 439. This urges the piston from left-to-right as viewed in FIGURE 7, of the drawings initially causing the reciprocation of the second movable platen remains temporarily stationary. The second movable platen 291 contacts the heads 298 of the draw bars 293 and 294 after the cores 313 have cleared the blow cavities 330 of the core and cavity assembly 311 after which the first movable platen 290 is reciprocated by the drawn bars 293 and 294 to the position illustrated in FIGURE 7 clearing the cores 310 of the core and cavity assembly 311 with respect to the injection cavities 317 carried by the stationary platen 280.

After the movable platens 290 and 291 are in the positions illustrated in FIGURE 7 of the drawings, the core and cavity assembly 311 is reciprocated downwardly (as viewed in the same figure) until the plurality of cores 310 and the parisons P carried thereby are each in alignment with a respective blow cavity 367 of the third molding means 365 as is illustrated in FIGURE 9 of the drawings. The downward movement of the core and cavity assembly 311 is initiated by the second movable platen 291 contacting and moving a switch arm 428 of a switch 430 as the platen 291 approaches its fully opened position. The switch 430 controls the electrical energy supply to a limit switch 431 over a conductor 432. The limit switch 431 is closed when the core and cavity assembly 311 is in the uppermost position thereof (FIGURE 7) and in contact with a switching arm 433 of the limit switch 431. The limit switch 431 actuates a four-way solenoid valve 434 by a conductor 435. Fluid from a suitable source (not shown) is introduced into each of the cylinders 354 by a conduit 436, the valve 434 and a conduit 437, thereby urging each of the pistons 357 and the core and cavity assembly 311 secured thereto by the piston rods 360 downwardly as viewed in FIGURE 7. The pair of identical adjustable stop means 378, 378 (FIGURE 13) limit the downward movement of the core and cavity assembly 311 and insure that the cores 310 carried by the core and cavity assembly 311 are each in alignment with an associated blow cavity 367 of the third molding means 365 (see FIGURE 9).

The movable platens 290 and 291 are then moved from the positions illustrated in FIGURE 9 of the drawings, to the position illustrated in FIGURE 10. This movement of the movable platens 290 and 291 is initiated by the core and cavity assembly 311 as it approaches its lowermost position contacting a switching arm 438 of a switch 430 carried by the first movable platen 290. The switch 440 actuates a timer 441 over a conductor 442 and a conductor 443. When the timer 441 times out, it triggers the four-way solenoid valve 425 over a conductor 444. Fluid pressure now flows from the source of supply through a conduit 429, the valve 425 and the conduit 387 to urge the piston 302 of the hydraulic mechanism 300 from right-to-left in FIGURE 7. This movement of the piston 302 moves the second movable platen 291 toward the left as viewed in FIGURE 7, it being noted at this time, the core and cavity assembly 311 is in the lowermost position thereof. The cores 313 carried by the second movable platen 291 are moved through the uppermost portion of the rectangular opening 343 in the first movable platen 290. At this time the first movable platen 290 has not yet moved because the second movable platen 291 has not yet contacted the rear plate 342 of the first movable platen 290. This contact between the first and second movable platens 290 and 291, respectively, occurs when the cores 313 carried by the second movable platen 291 and the cores 310 of the reciprocal core and cavity assembly 311 are spaced substantially at identical distances from the respective cavities 317 and 367. Now as the second movable platen 291 urges the first movable platen to the left as viewed in FIGURE 7, the cores 310 and 313 simultaneously enter and close the respective cavities 367 and 317.

At the same time the switch 440 actuates the timer 441 to close the cavities in the manner heretofore described, the switch 440 also actuates three solenoids 445, 446 and 447 associated with the respective directional valves 404, 411 and 424.

The solenoid 445 is energized over the conductor 442 connected to the switch 440 and a conductor 448. The solenoid 446 of the directional valve 411 is energized over the conductor 442, the conductor 443 and a conductor 450. The solenoid 447 associated with the directional valve 424 is energized over the conductor 442, the conductor 443 and a conductor 451. The directional valves 404, 411 and 424 are each positioned to direct the flow of compressed air and vacuum to the proper stations during the formation of a plurality of parisons $P^1$ (FIGURE 10) and the blowing of articles $A^2$ from the previously formed parisons P, which parisons were formed in the manner heretofore described in the consideration of FIGURE 8.

The plurality of parisons $P^1$ of FIGURE 10 are each formed between a core 313 carried by the second movable platen 291 and an injection cavity 317 in a manner similar to that described heretofore in the description of FIGURE 7.

When the platens 290 and 291 are in the positions illustrated in FIGURE 10 and the respective molds are closed, the pressure operated switch 386 again closes and current flows over the conductor 390, the timer 388 and the conductor 392 to again actuate the four-way solenoid valve 391. The valve 391 operates in the manner heretofore described and heat-plasticized thermoplastic material is injected through each of the nozzles 282 into the injection cavities 317 to mold a plurality of parisons $P^1$ of FIGURE 10.

The pressure operated switch 386 sets the timer 397 over the conductors 390 and 398, and over the conductor 407 energizes the three-way solenoid valve 406. Compressed air flows through the conduit 408, the valve 406, the conduit 410, the now repositioned directional valve 411, and a conduit 452 to the conduit 336 of each of the cores 310 in a manner clearly illustrated in FIGURE now in alignment with an associated one of the blow cavities 367 of the first molding means 365 as shown in FIGURE 10). The compressed air is introduced through the cores 310 to a manner clearly illustrated in FIGURE 12 of the drawings to urge each of the parisons P previously molded as described heretofore into a plurality of articles $A^2$. During the blow molding of the plurality of articles $A^2$ each of the blow cavities 367 is vented by the actuation of the solenoid operated valve 400 over the conductor 401 from the timer 397. This places the source of vacuum in fluid communication with the conduit 402 in communication with each of the blow cavities 367 over a flow path traced by the conduit 402, the valves 400, the conduit 403, now repositioned directional valve 404, a conduit 453, and the flexible conduit 373 in communication with the interior of each of the cavities 367.

After the parisons P¹ have been molded and articles A² have been formed, the timer 388 times out in the manner heretofore described thereby actuating the four-way solenoid valve 391 to reciprocate the piston 396 to the position illustrated in FIGURE 7 by fluid pressure introduced into the cylinder 395 in a manner heretofore described. This takes the pressure off the parisons P¹ in the cavities 317.

When the timer 388 times out the timer 414 is again actuated over the conductor 415 to move the movable platens 290 and 291 from left-to-right from the position of FIGURE 10 to the position of FIGURE 9, in a manner heretofore described, and a further description thereof is deemed unnecessary for a complete understanding of this invention.

Shortly after the above-mentioned movement of the movable platens 290 and 291, the timer 397 also runs out in a manner substantially identical to that heretofore described by which the solenoid valves 406 and 400 are actuated to respectively shut off the compressed air to the cores 310 and the vacuum to the blow cavities 367.

The timing out of the timer 397 actuates the two-way solenoid valve 421 over the conductor 416 after the platens 290 and 291 have opened by left-to-right movement as view in FIGURE 10. Compressed air from the source of supply is conducted by the conduit 422 through the valve 421, the conduit 423, the now rotated directional valve 424, a conduit 454, and the flexible conduits 335 to each of the blow cavities carried by the reciprocal core and cavity 311. Compressed air flowing into each of the cavities 330 ejects the articles A out of each of these cavities.

The timer 414 not only initiates the left-to-right opening or movement of the movable platens 290 and 291, but also closes the solenoid valve 421 to cut off the supply of compressed air to each of the blow cavities 330 in an obvious manner prior to the above-noted opening movement of the platens 290 and 291.

The core and cavity assembly 311 is then reciprocated from the position shown in FIGURE 9 to the position shown in FIGURE 11. This movement is begun by the second movable platen 291 striking the arm 428 of the switch 430, which closes contacts of this switch forming a circuit through the limit switch 440 over the conductors 432, 432 and by a conductor 455 to actuate the solenoid valve 434. Fluid under pressure from a reservoir is conducted by a conduit 456, the valve 434 and a conduit 457 into the chamber 358 of each of the cylinders 354, it being noted that at this time the pistons 357 are each in the lowermost positions thereof. As fluid enters the chambers 358 the pistons 357 are urged upwardly (as viewed in FIGURE 7) and the core and cavity assembly 311 is reciprocated in the same direction until the cores 310, 313 and the cavities 317 and 330 are in axial alignment. As the core and cavity assembly 311 moves upwardly the switching arm 438 of the switch 440 raised upwardly to the position shown in FIGURE 7 and repositions the limit switch 440. This actuates the solenoids 445, 446, and 447 of the respective directional valves 404, 411 and 424 in the manner heretofore initially described to return these directional valves to the platens 290 and 291 again closing to repeat the cycle.

When the core and cavity assembly 311 has reached the uppermost position thereof, the switch arm 433 actuates the limit switch 431 which in turn starts the timer 441 over a conductor 458, a switch 460 and a conductor 461. When the timer 441 runs out, the four-way solenoid valve 425 is again actuated to move the movable platens 290 and 291 to the positions illustrated in FIGURE 8 of the drawings after which the control system 385 continues to repeatedly operate until the switch 460 is opened. A new cycle will not automatically start when the switch 460 is opened because this would prevent the timer 441 from being actuated by the switch 431.

During the operation of the molding machine 275, the various cores and cavities are continuously supplied with temperature control fluid to maintain the temperatures of the parisons and blown articles within a desirable range.

Another novel molding machine constructed in accordance with this invention is schematically illustrated in FIGURE 15 of the drawings, and is generally referred to by the reference numeral 500. With but one exception, the structure and function of the molding machine 500 is identical to that of the molding machine 20 and, therefore, like reference numerals with alphabetic suffixes are employed in FIGURE 15 to designate equivalent comparable structural components of the molding machines 20 and 500.

The molding machine 500 of FIGURE 15 includes a stationary platent 33a and movable platens 51a, 52a. A hydraulic mechanism 73a including a housing 74a, a piston 80a and a piston rod 81a connected to the platen 52a imparts reciprocating movement to the platen 52a and the mold means 101a carried thereby. The platen 52a is guided during its movement by tie bars corresponding to the tie bars 44 through 47 of the molding machine 20. One of the tie bars 44a is illustrated in FIGURE 15 connected between an upstanding support 23a and the platen 33a.

The platen 51a includes a core assembly 105a corresponding to the core assembly 105 of the molding machine 20. The core assembly 105a includes a plurality of oppositely directed cores 104a and 108a which cooperate with mold sections 102a, 106a for forming parisons Pa and articles Aa in the manner heretofore described.

In lieu of the draw bars 88 of the molding machine 20 which caused the platen 51 to open upon the movement of the platen 52 under the influence of the hydraulic mechanism 73, the molding machine 500 includes a rack and gear mechanism, generally referred to by the reference numeral 505 for imparting positive reciprocating movement to the platens 51a and 52a. The rack and gear mechanism 505 includes a pair of racked members 506, 507 secured to the respective platens 52a and 33a. The rack members 506, 507 are in parallel relationship to each other, to the piston rod 81a and to the path of movement defined by the reciprocation of the platens 51a, 52a. The rack mechanism 506 is positioned above the rack mechanism 507 with the rack teeth (unnumbered) of the rack mechanisms 506, 507 being in opposed relationship. The rack mechanisms 506, 507 are also in a common vertical plane.

The rack mechanism 506 is fixedly secured to the platen 52a while the rack mechanism 507 is secured to the platen 33a by means of a spring loaded adaptor 508 which compensates for any slight differences in the length of the racks 506, 507 as will be more apparent hereafter. The adaptor 508 includes a housing 510 fixed to the platen 33a by bolts (not shown) or similar conventional securing means. The housing 510 defines a chamber 511 in which is guidably and reciprocally mounted a plate 512 to which is fixedly secured the rack mechanism 507. The plate 512 includes a pair of apertures 513, 514 through which pass respective bolts 515, 516. The bolts 515, 516 have respective heads 517, 518 and opposite end portions thereof are threadably secured into an end wall 520 of the housing 510. Compression springs 521, 522 are positioned between the respective heads 517, 518 and the plate 512, thereby normally urging the plate 512 and the rack mechanism 507 fixed thereto from left-to-right as viewed in FIGURE 15 of the drawings.

A gear 525 is journalled for rotation upon the platen 51a in a conventional manner. Teeth (unnumbered) of the gear 525 are in mesh with the teeth (also unnumbered) of the rack mechanisms 506 and 507.

When the blow molding machine 500 is operating in the manner heretofore described with respect to the blow-molding machine 20, and the piston 80a of the hydraulic mechanism 73a moves from left-to-right in FIGURE 15 of the drawings, and the platen 52a and the rack mechanism 506 carried thereby are similarly moved in an identical direction. The rack mechanism 506 rotates the gear 525 in a clockwise direction. As the gear 525 rotates it pulls against the rack mechanism 507 and causes the platen 51a to move from left-to-right toward the platen 33a. The rack and gear mechanism 505 thus permits the simultaneous movement of the platens 51a, 52a toward the stationary platen 33a during the closing movement of these platens. If the rack mechanisms 506, 507 are of equal length, the platen 51a closes with the platen 33a at the same time that the platen 52a closes with the platen 51a.

In the event the closing force exerted upon the platens by the hydraulic mechanism 73a is excessive, the pressure exerted by the piston rod 81a which might otherwise buckle the rack mechanisms 506, 507 is precluded from doing so by the spring loaded adaptor 508. If, for example, the platens 51a and 33a are closed and the gear 525 rotates slightly in a clockwise direction due to a dissimilarity in the lengths of the rack mechanisms 506, 507, the rack mechanism 507 is pulled from right-to-left by the meshing engagement thereof with the gear 525. Any such slight movement is compensated by the spring loaded adaptor 508 by the movement of the plate 512 against the compression springs 521, 522. As the plate is drawn slightly from right-to-left the springs 521, 522 compress and permit slight right-to-left movement of the rack mechanism 507, thereby preventing buckling or related damage to the rack mechanism 507 and/or the gear 525.

The platens 51a and 52a are open from the closed position just described by the reverse movement of the piston 80a of the hydraulic mechanism 73a. In this case the piston rod 81a moves from right-to-left drawing the rack mechanism 506 in this same direction and causing rotation of the gear 525 in a counterclockwise direction. The rotation of the gear 525 in a counterclockwise direction moves the platen 51a from right-to-left at a speed equal to one-half the speed of the platen 52a.

Various modifications of the molding machines heretofore described are considered to be within the scope of this invention. In particular, while the rack and gear mechanism 505 has been described particularly with respect to the molding machine 500, the same mechanism may be employed in the molding machine 385 (FIGURE 7) in lieu of the draw bars 293. In addition, while only a single rack and gear mechanism 505 has been disclosed at one side of the molding machine 500, a similar rack and gear mechanism operation in unison with the disclosed rack and gear mechanism could be provided at the opposite side of the molding machine 500.

It is also within the scope of this invention to mount the cores 310 of the molding machine 275 (FIGURE 12) for sliding movement in much the same manner as the cores 104, 108. In this case, each of the cores 310 would include components corresponding to those of the molding machine 20 such as the elements 163, 155, 156, 208, 164, etc. In the closed position of the shiftable cores 310, the pressurized plastic entering the chamber between the cores 310 and the cavities 317 would shift the cores 310 to close the passages 208 in the manner heretofore described with respect to the molding machine 20. Air introduced into the cores 310 after the cores were shifted to a blow cavity would first cause a build-up of pressure within the cores 310 which would shift the cores to open the circumferential blow passage in each core prior to blowing an associated parison to form an article.

While each of the molding machines ejects a parison first and blown article second, it is within the scope of this invention to reverse this process and blow articles and thereafter inject parisons. For example, with the mold means 306, 307 closed (FIGURE 12) and a previously molded parison associated with each of the cores 313, air is introduced to blow these parisons to form articles prior to the injection of plastic into the molding means 306.

From the foregoing, it will be seen that novel and advantageous provision has been made for carrying out the desired end. However, attention is again directed to the fact that variations may be made in the example molding machines disclosed herein, as well as the disclosed methods without departing from the spirit and scope of this invention as defined in the appended claims.

I claim:

1. A molding machine comprising a plurality of relatively movable platens, molding means associated with said platens, said platens being movable between positions at which said molding means are closed to define closed molding chambers and positions at which said platens are opened to define open molding chambers, means for moving said platens between said first and second positions, and said moving means including means for moving at least two of said platens simultaneously in the same direction but at differential speeds.

2. The molding machine as defined in claim 1 wherein said moving means are defined by rack and gear means.

3. The molding machine as defined in claim 2 wherein said rack and gear means includes a rack carried by each of a pair of said platens, a gear carried by another of said platens, and said racks each being enmeshed in relationship with said gear.

4. The molding machine as defined in claim 2 wherein means are provided for permitting movement of a portion of said rack and gear means relative to the platen carrying said last-mentioned portion in a direction substantially parallel to the direction of movement of said platens.

5. The molding machine as defined in claim 3 wherein one of said racks is secured to an associated platen by means including spring means for biasingly maintaining said last-mentioned rack in its supported position.

6. A molding machine comprising a pair of oppositely directed male cores and a female mold cavity in alignment with said cores in the closed positions thereof, means for injecting molten material between a first of said cores and a first of said female mold cavities in a first closed position thereof to form a parison, means defined by each of the cores for blowing a molded parison to form an article, said blowing means of each core including aperture means in fluid communication with a pressurized source of fluid, and means mounting said cores for simultaneous sliding movement whereby upon the injection of molten material between said first core and mold cavity the aperture means therebetween is closed by said molten material preventing the same from entering into and blocking said last-mentioned aperture means and correspondingly opening the aperture means of the other of the cores for blowing an article from a previously formed parison carried thereby.

7. The molding machine as defined in claim 6 wherein said male cores are carried by a rotatable support, and means are provided for rotating said support to reversibly and continually alternate the relationship of said cores and cavities.

8. The molding machine as defined in claim 6 wherein passage means are provided for at all times maintaining the aperture means of said simultaneously slidable cores in fluid communication with each other.

9. The molding machine as defined in claim 6 wherein said cores are carried by common slidable supporting means.

10. A molding machine comprising first, second and third platens, means mounting a portion of said first platen for relative movement with respect to said first platen, a pair of oppositely directed male cores carried by said first platen, at least one female mold cavity carried by each of said second and third platens, said cores and cavity being in alignment in a closed position of said platens, means for providing relative movement between said platens for moving said platens between opened and closed positions thereof, means defined by each of the cores for blowing a molded parison to form an article, the blowing means of each core including aperture means in fluid communication with a pressurized source of fluid, and means mounting said cores for a simultaneous sliding movement relative to said platen portion whereby upon the introduction of pressurized molten material between the core and cavity of said first and third platens the aperture means thereof are automatically closed and the aperture means of the core between said first and second platens are opened for blowing an article from a previously formed parison carried thereby.

11. The molding machine as defined in claim 10 wherein said means for moving said platens between said open and closed positions include means for moving at least two of said platens simultaneously in the same direction but at different speeds.

12. The molding machine as defined in claim 10 including means for rotating said relatively movable portion of said first platen.

13. The molding machine as defined in claim 10 wherein said cores are carried by common supporting means slidable relative to the movable portion of said first platen.

References Cited

UNITED STATES PATENTS

| | | |
|---|---|---|
| 2,975,473 | 3/1961 | Hagen et al. |
| 3,069,722 | 12/1962 | Kato. |
| 3,116,516 | 1/1964 | Moslo. |

FOREIGN PATENTS

| | | |
|---|---|---|
| 1,097,662 | 1/1961 | Germany. |
| 225,409 | 1/1963 | Austria. |

WILBUR L. McBAY, *Primary Examiner.*